United States Patent
Touch et al.

(10) Patent No.: US 9,921,799 B2
(45) Date of Patent: Mar. 20, 2018

(54) COMPUTER SYSTEMS FOR STREAMING INFLUENCER DEVICE AUDIO CONTENT TO LISTENER DEVICES

(71) Applicant: MUMO, Inc., Los Angeles, CA (US)

(72) Inventors: Jean-Marc Touch, Los Angeles, CA (US); Ryan Britt, Los Angeles, CA (US); Jon Kraft, Beverly Hills, CA (US); Edward Chan, Claremont, CA (US)

(73) Assignee: MUMO, Inc., Los Angeles, CA (US)

( * ) Notice: Subject to any disclaimer, the term of this patent is extended or adjusted under 35 U.S.C. 154(b) by 0 days.

(21) Appl. No.: 15/016,215

(22) Filed: Feb. 4, 2016

(65) Prior Publication Data
US 2016/0224311 A1 Aug. 4, 2016

Related U.S. Application Data

(60) Provisional application No. 62/111,856, filed on Feb. 4, 2015.

(51) Int. Cl.
| | |
|---|---|
| *G06F 17/00* | (2006.01) |
| *G06F 3/16* | (2006.01) |
| *H04L 29/06* | (2006.01) |
| *H04N 7/16* | (2011.01) |
| *H04N 21/254* | (2011.01) |

(52) U.S. Cl.
CPC .......... *G06F 3/165* (2013.01); *H04L 65/4076* (2013.01); *H04L 65/4092* (2013.01); *H04N 7/162* (2013.01); *H04N 21/2541* (2013.01)

(58) Field of Classification Search
CPC ......... H04N 21/2541; H04N 21/25816; H04N 21/25891; H04N 21/6125; H04N 7/162; H04N 7/17318
See application file for complete search history.

(56) References Cited

U.S. PATENT DOCUMENTS

| | | | | |
|---|---|---|---|---|
| 2007/0300260 | A1* | 12/2007 | Holm | H04N 5/4401 725/47 |
| 2009/0148124 | A1* | 6/2009 | Athsani | G06Q 30/02 386/241 |
| 2013/0247120 | A1* | 9/2013 | Milgramm | H04N 21/2187 725/110 |
| 2013/0291035 | A1* | 10/2013 | Jarvis | H04L 65/4084 725/109 |

* cited by examiner

*Primary Examiner* — Thomas Maung
(74) *Attorney, Agent, or Firm* — Banner & Witcoff, Ltd.

(57) ABSTRACT

Aspects of the disclosure relate to streaming influencer device audio content to listener devices. In some embodiments, a computing platform may receive, from a first influencer device, first stream information associated with a first music stream. Subsequently, the computing platform may identify a plurality of listener devices that subscribe to receive music streams from the first influencer device. The music sharing computing platform then may evaluate first tracking information associated with a first listener device of the plurality of listener devices to enforce one or more playback restrictions on the first listener device, and may evaluate second tracking information associated with a second listener device of the plurality of listener devices to enforce the one or more playback restrictions on the second listener device. Based on evaluating the tracking information, the computing platform may share the first music stream with the first listener device and the second listener device.

16 Claims, 25 Drawing Sheets

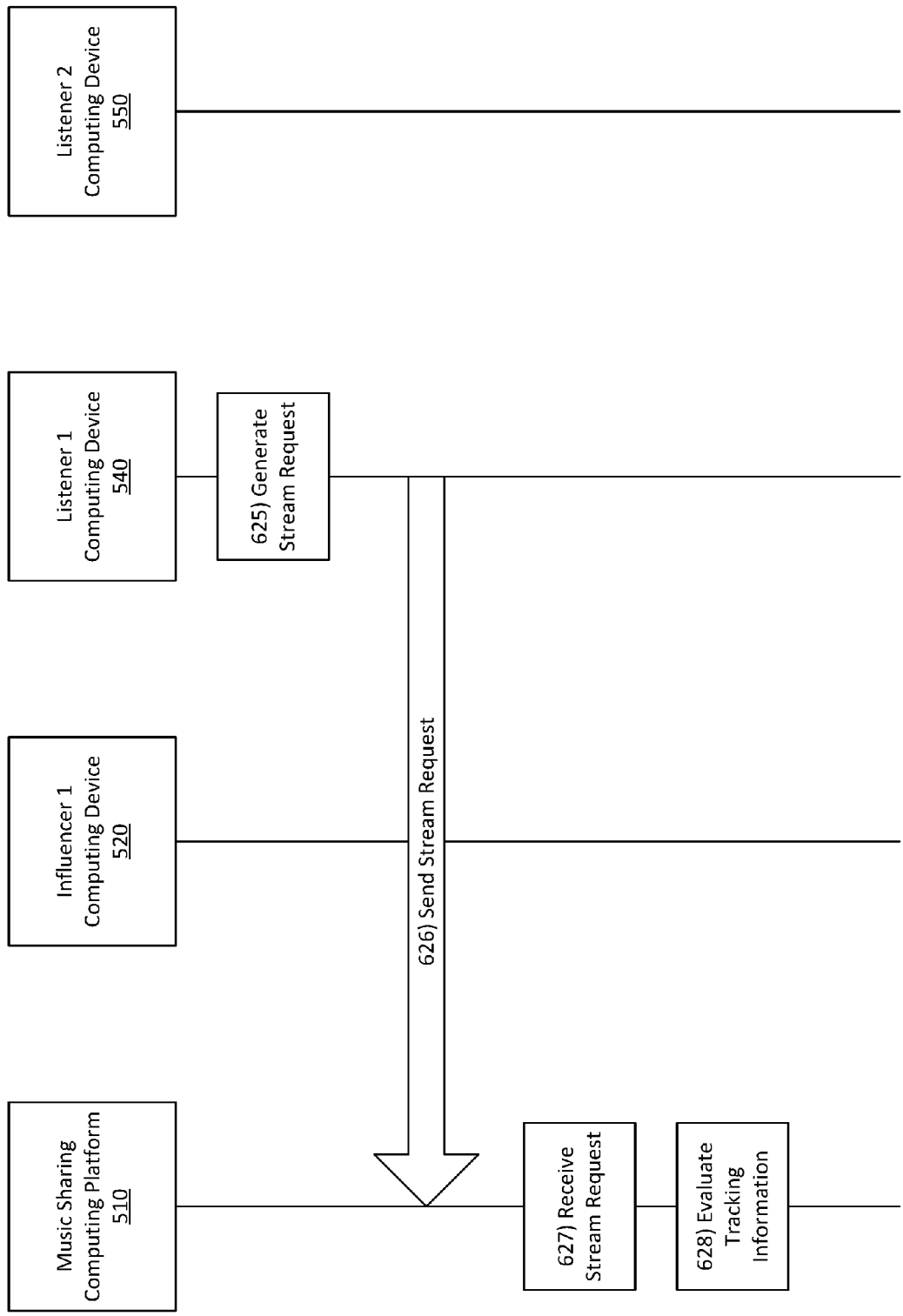

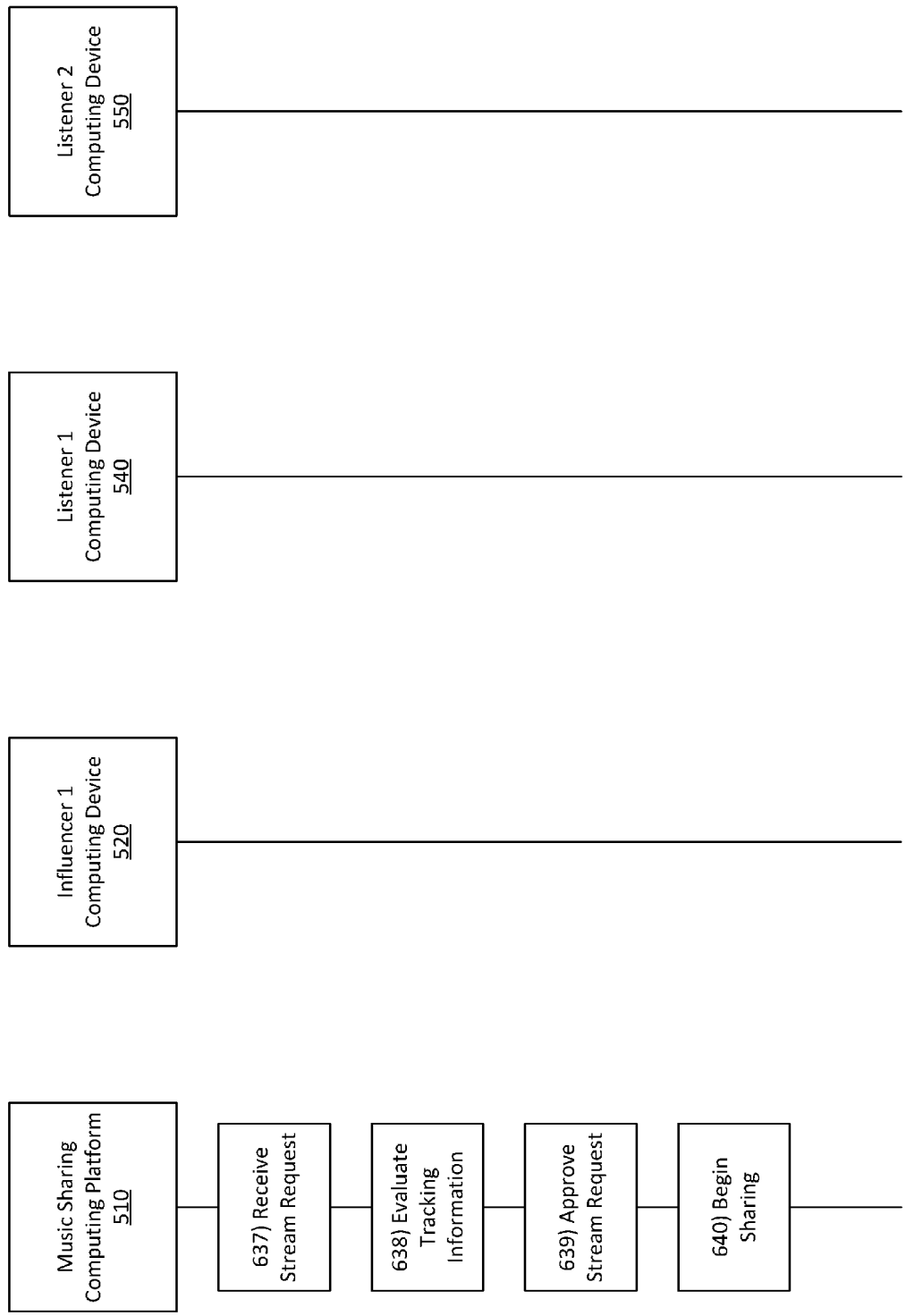

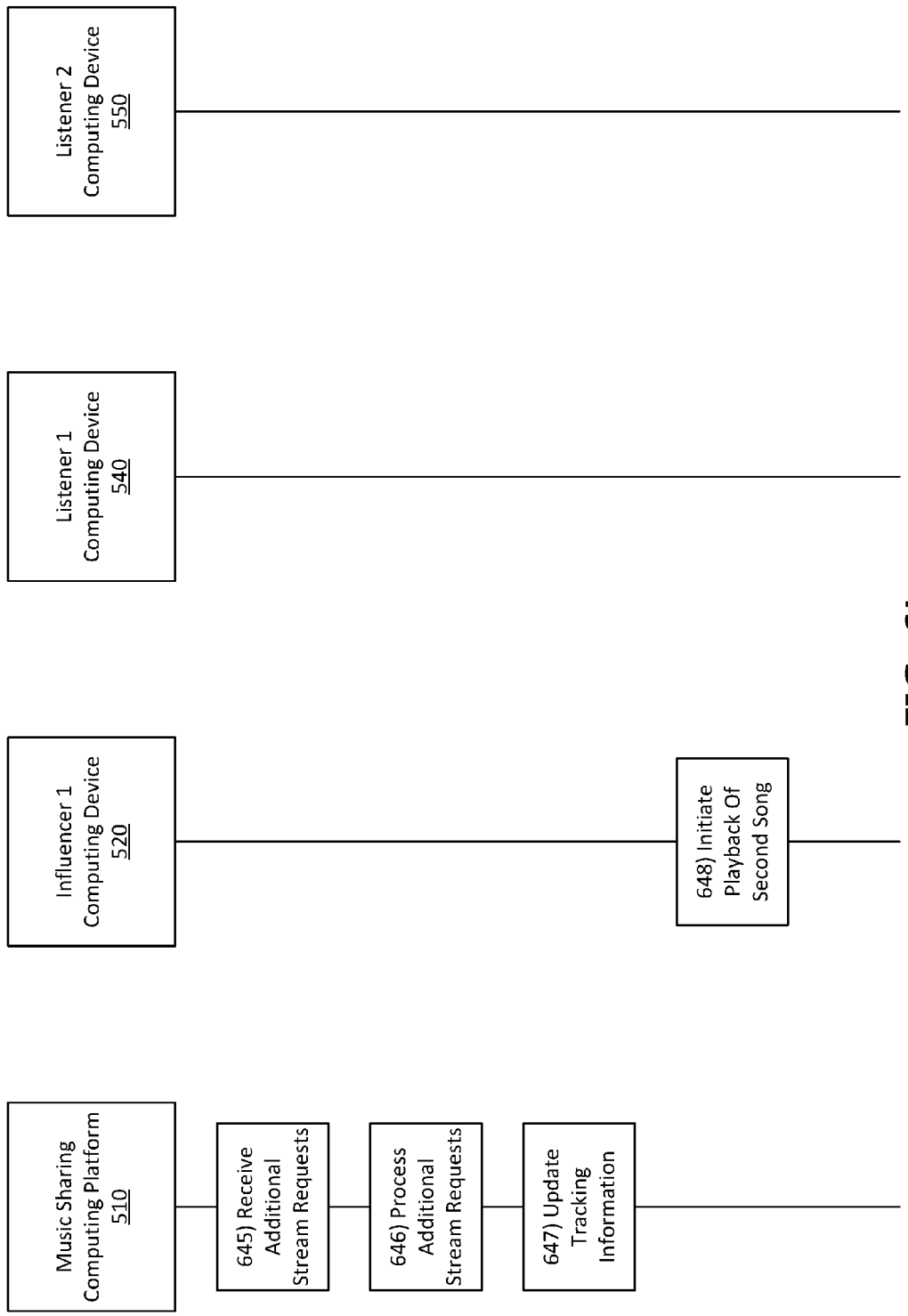

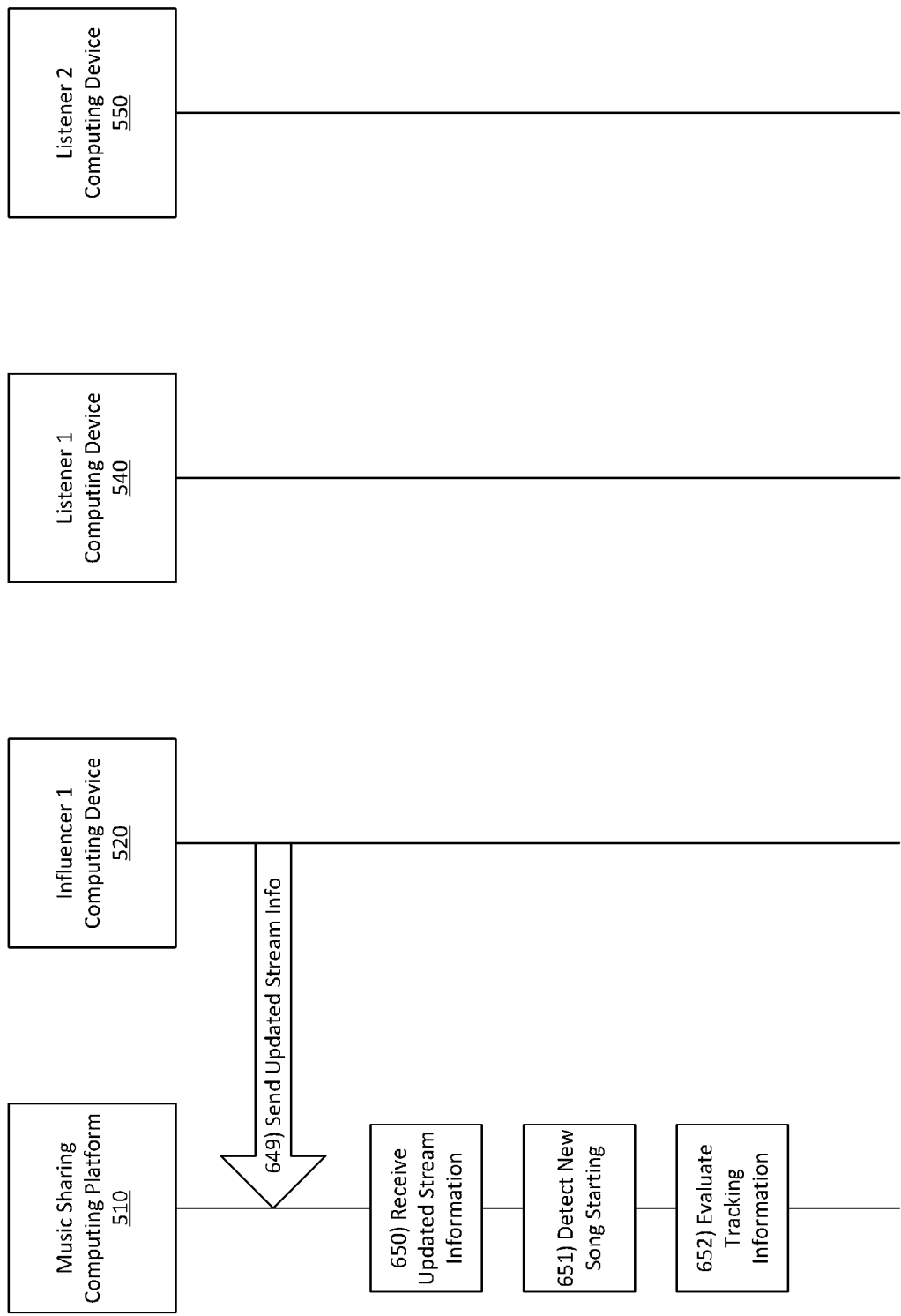

COMPUTER SYSTEMS FOR STREAMING INFLUENCER DEVICE AUDIO CONTENT TO LISTENER DEVICES

CROSS-REFERENCE TO RELATED APPLICATIONS

This application claims the benefit of and priority to U.S. Provisional Patent Application Ser. No. 62/111,856, filed Feb. 4, 2015, and entitled "Sharing Music Streams and Enforcing License Restrictions," which is hereby incorporated by reference herein in its entirety.

BACKGROUND

Aspects of the disclosure relate to computing hardware and computer software. In particular, one or more aspects of the disclosure generally relate to computing hardware and computer software for streaming influencer device audio content to listener devices.

Internet radio and other forms of online music streaming and/or audio streaming are becoming increasingly popular, particularly as more and more people adopt and use mobile computing devices, such as smart phones, tablet computers, wearable devices, and other types of mobile devices. As such streaming becomes increasingly popular, it may be difficult to scale the underlying technology to support increasing numbers of users. In particular, providing streaming audio content to various user devices may be technologically complex because of the computing resources and network resources required to stream audio content to many devices, and may be further complicated because of license restrictions and/or other playback restrictions that might need to be complied with when streaming such content. As a result, it may be difficult to provide streaming audio content to multiple listener devices.

SUMMARY

Aspects of the disclosure provide effective, efficient, scalable, and convenient technical solutions that address and overcome the technical problems associated with providing streaming audio content to multiple listener devices. In particular, one or more aspects of the disclosure address and overcome one or more internet-centric challenges that arise when providing internet radio and other forms of online music streaming and/or audio streaming, particularly in instances in which different devices may join music streams at different points in time and/or with different listening histories, and as a result, may be subject to different restrictions on what content can be played.

In accordance with one or more embodiments, a music sharing computing platform having at least one processor, a memory, and a communication interface may receive, via the communication interface, and from a first influencer device, first stream information associated with a first real-time music stream. Based on receiving the first stream information associated with the first real-time music stream from the first influencer device, the music sharing computing platform may identify a plurality of listener devices that subscribe to receive music streams from the first influencer device. Subsequently, the music sharing computing platform may evaluate first tracking information associated with a first listener device of the plurality of listener devices to enforce one or more playback restrictions on the first listener device. In addition, the music sharing computing platform may evaluate second tracking information associated with a second listener device of the plurality of listener devices to enforce the one or more playback restrictions on the second listener device. Based on evaluating the first tracking information associated with the first listener device of the plurality of listener devices and the second tracking information associated with the second listener device of the plurality of listener devices, the music sharing computing platform may share the first real-time music stream with the first listener device of the plurality of listener devices and the second listener device of the plurality of listener devices.

In some embodiments, the first real-time music stream may be defined by one or more playback selections made by a user of the first influencer device. In some instances, the first stream information associated with the first real-time music stream received from the first influencer device may include metadata associated with a first song being played back by the first influencer device. In some instances, the first stream information associated with the first real-time music stream received from the first influencer device may include audio data associated with a first song being played back by the first influencer device.

In some embodiments, after identifying the plurality of listener devices that subscribe to receive the music streams from the first influencer device, the music sharing computing platform may send, via the communication interface, and to the first listener device of the plurality of listener devices, a first notification indicating that the first real-time music stream has started. In addition, the music sharing computing platform may send, via the communication interface, and to the second listener device of the plurality of listener devices, a second notification indicating that the first real-time music stream has started.

In some embodiments, the one or more playback restrictions may include one or more license restrictions. In some instances, the one or more playback restrictions may include one or more playback rules different from the one or more license restrictions.

In some embodiments, the second listener device of the plurality of listener devices may be different from the first listener device of the plurality of listener devices.

In some embodiments, the one or more playback restrictions may be enforced on the second listener device separately from the one or more playback restrictions enforced on the first listener device.

In some embodiments, in sharing the first real-time music stream with the first listener device of the plurality of listener devices and the second listener device of the plurality of listener devices, the music sharing computing platform may send, via the communication interface, and to the first listener device of the plurality of listener devices, streaming audio data associated with the first real-time music stream to cause the first listener device of the plurality of listener devices to play back audio content associated with the first real-time music stream substantially contemporaneously with the first influencer device. In addition, the music sharing computing platform may send, via the communication interface, and to the second listener device of the plurality of listener devices, the streaming audio data associated with the first real-time music stream to cause the second listener device of the plurality of listener devices to play back the audio content associated with the first real-time music stream substantially contemporaneously with the first influencer device.

In some embodiments, based on sharing the first real-time music stream with the first listener device of the plurality of listener devices and the second listener device of the plurality of listener devices, the music sharing computing platform may update first tracking information associated with the first listener device of the plurality of listener devices. In addition, based on sharing the first real-time music stream with the first listener device of the plurality of listener devices and the second listener device of the plurality of listener devices, the music sharing computing platform may update second tracking information associated with the second listener device of the plurality of listener devices.

In some embodiments, after sharing the first real-time music stream with the first listener device of the plurality of listener devices and the second listener device of the plurality of listener devices, the music sharing computing platform may receive, via the communication interface, from at least one listener device not included in the plurality of listener devices, at least one request for the first real-time music stream. Subsequently, the music sharing computing platform may process the at least one request for the first real-time music stream received from the at least one listener device not included in the plurality of listener devices, based on tracking information associated with the at least one listener device not included in the plurality of listener devices.

In some embodiments, the music sharing computing platform may detect that a new song is starting on the first real-time music stream. Based on detecting that the new song is starting on the first real-time music stream, the music sharing computing platform may reevaluate the first tracking information associated with the first listener device of the plurality of listener devices to enforce the one or more playback restrictions on the first listener device. Based on reevaluating the first tracking information associated with the first listener device of the plurality of listener devices to enforce the one or more playback restrictions on the first listener device, the music sharing computing platform may allow the first listener device of the plurality of listener devices to continue playback of the first real-time music stream.

In some embodiments, based on detecting that the new song is starting on the first real-time music stream, the music sharing computing platform may reevaluate the second tracking information associated with the second listener device of the plurality of listener devices to enforce the one or more playback restrictions on the second listener device. Based on reevaluating the second tracking information associated with the second listener device of the plurality of listener devices to enforce the one or more playback restrictions on the second listener device, the music sharing computing platform may prevent the second listener device of the plurality of listener devices from continuing playback of the first real-time music stream.

In some embodiments, based on allowing the first listener device of the plurality of listener devices to continue playback of the first real-time music stream, the music sharing computing platform may update the first tracking information associated with the first listener device of the plurality of listener devices. In addition, based on preventing the second listener device of the plurality of listener devices from continuing playback of the first real-time music stream, the music sharing computing platform may update the second tracking information associated with the second listener device of the plurality of listener devices.

In some embodiments, prior to receiving the first stream information associated with the first real-time music stream from the first influencer device, the music sharing computing platform may receive, via the communication interface, and from the first influencer device, a first registration request. Subsequently, the music sharing computing platform may store registration information for the first influencer device based on the first registration request received from the first influencer device.

In some embodiments, prior to receiving the first stream information associated with the first real-time music stream from the first influencer device, the music sharing computing platform may receive, via the communication interface, and from the first listener device of the plurality of listener devices, a second registration request. Subsequently, the music sharing computing platform may store registration information for the first listener device of the plurality of listener devices based on the second registration request received from the first listener device of the plurality of listener devices. In addition, the music sharing computing platform may receive, via the communication interface, and from the second listener device of the plurality of listener devices, a third registration request. Subsequently, the music sharing computing platform may store registration information for the second listener device of the plurality of listener devices based on the third registration request received from the second listener device of the plurality of listener devices.

In some embodiments, the music sharing computing platform may receive, via the communication interface, and from a second influencer device different from the first influencer device, second stream information associated with a second real-time music stream. Based on receiving the second stream information associated with the second real-time music stream from the second influencer device, the music sharing computing platform may identify a second plurality of listener devices that subscribe to receive music streams from the second influencer device. Subsequently, the music sharing computing platform may evaluate third tracking information associated with a third listener device of the second plurality of listener devices to enforce the one or more playback restrictions on the third listener device. In addition, the music sharing computing platform may evaluate fourth tracking information associated with a fourth listener device of the second plurality of listener devices to enforce the one or more playback restrictions on the fourth listener device. Based on evaluating the third tracking information associated with the third listener device of the second plurality of listener devices and the fourth tracking information associated with the fourth listener device of the second plurality of listener devices, the music sharing computing platform may share the second real-time music stream with the third listener device of the second plurality of listener devices and the fourth listener device of the second plurality of listener devices.

In accordance with one or more additional and/or alternative embodiments, a computing platform that includes at least one processor, memory, and a communication interface may receive data associated with a real-time music stream from an influencer device. Subsequently, the computing platform may identify a plurality of listener devices that subscribe to one or more music streams from the influencer device. The computing platform then may broadcast or otherwise share the influencer device's real-time music stream to the plurality of listener devices while enforcing one or more license restrictions separately for each listener device of the plurality of listener devices.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1:
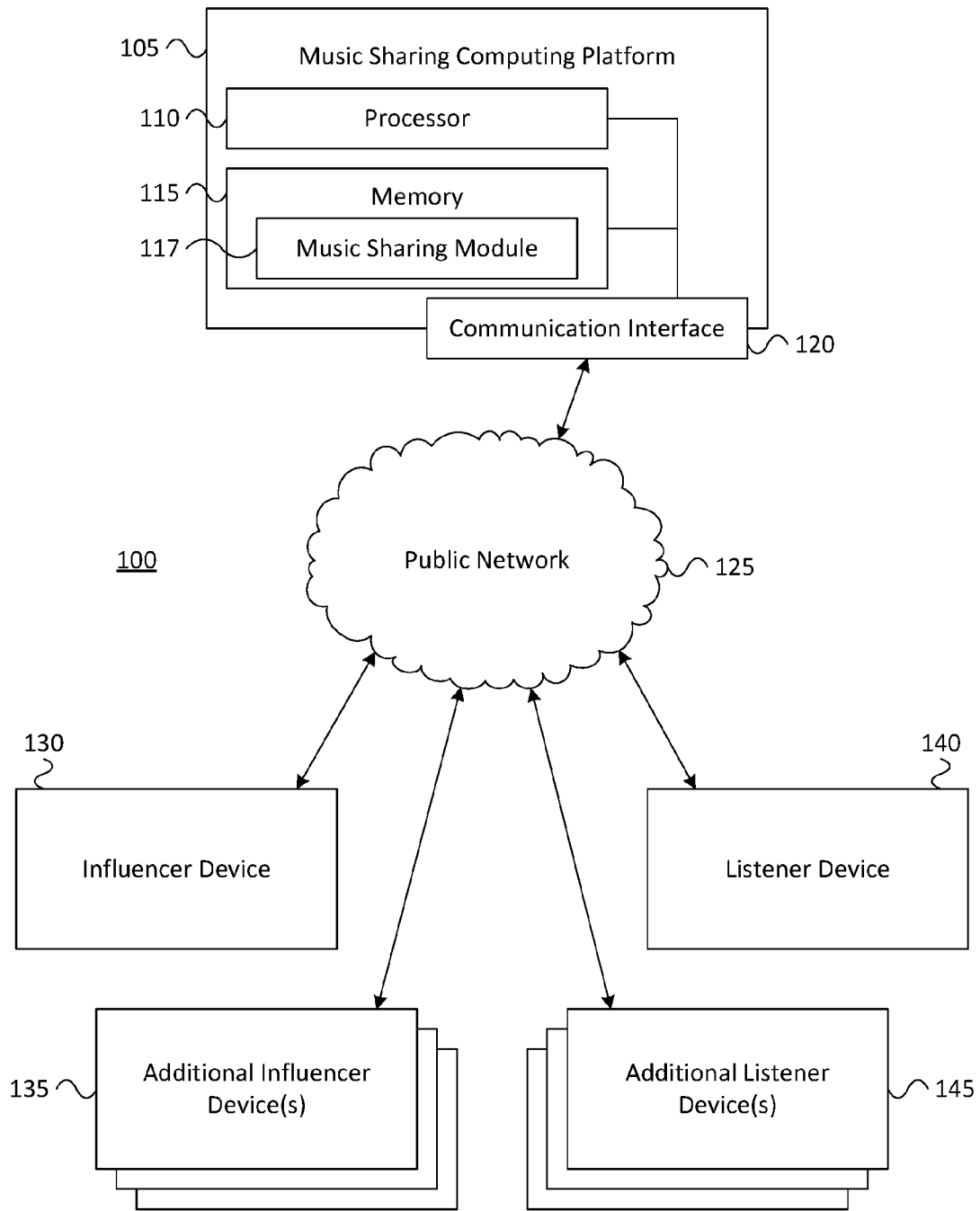
FIG. 1 depicts an illustrative computing environment for sharing music streams and enforcing license restrictions in accordance with one or more example embodiments.

FIG. 1 depicts an illustrative computing environment for sharing music streams and enforcing license restrictions in accordance with one or more example embodiments. Referring to FIG. 1, computing environment 100 may include one or more computing devices. For example, computing environment 100 may include an influencer device 130 and one or more additional influencer devices 135. In addition, computing environment 100 may include a listener device 140 and one or more additional listener devices 145. Influencer device 130, influencer devices 135, listener device 140, and listener devices 145 may be any type of computing device capable of receiving a user interface, receiving input via the user interface, and communicating the received input to one or more other computing devices. For example, influencer device 130, influencer devices 135, listener device 140, and listener devices 145 may be a desktop computer, laptop computer, tablet computer, smart phone, or the like. Additionally, and as illustrated in greater detail below, any and/or all of influencer device 130, influencer devices 135, listener device 140, and listener devices 145 may, in some instances, be special-purpose computing devices configured to perform specific functions.

Computing environment 100 also may include one or more computing platforms. For example, computing environment 100 may include music sharing computing platform 105. Music sharing computing platform 105 may include one or more computing devices configured to perform one or more of the functions described herein. For example, music sharing computing platform 105 may include one or more computers (e.g., laptop computers, desktop computers, servers, server blades, etc.).

Computing environment 100 also may include one or more networks, which may interconnect one or more of music sharing computing platform 105, influencer device 130, influencer devices 135, listener device 140, and listener devices 145. For example, computing environment 100 may include public network 125, which may include one or more networks (e.g., the Internet) that connect music sharing computing platform 105, influencer device 130, influencer devices 135, listener device 140, and listener devices 145.

Music sharing computing platform 105 may include one or more processor(s) 110, memory 115, and communication interface 120. Communication interface 120 may be a network interface configured to support communication between music sharing computing platform 105 and public network 125 and/or one or more sub-networks thereof. Memory 115 may include one or more program modules that include instructions that when executed by the processor(s) 110 cause music sharing computing platform 105 to perform one or more functions described herein. For example, memory 115 may include music sharing module 117, which may include instructions that when executed by processor(s) 110 cause music sharing computing platform 105 to perform one or more functions described herein.

In one or more arrangements, influencer device 130 may be a computing device, such as a mobile computing device (e.g., a smartphone, tablet computer, and/or other type of mobile device), used by an influencer user of a music sharing platform (which may, e.g., be provided by music sharing computing platform 105), such as a music-sharing social-networking service. Influencer device 130 may, for example, store a music library and playback software, and the influencer user (who may, e.g., use influencer device 130) may use the playback software to organize the music library, add content to the music library, play one or more songs from the music library, create one or more playlists of songs in the music library, play one or more playlists of songs, and/or execute one or more other functions associated with the music library. As illustrated below, the one or more songs played by the influencer user from the music library may be shared in real-time as one or more music streams, and the one or more music streams may be shared (e.g., by music sharing computing platform 105) with one or more listener devices and/or corresponding users of such listener devices who may subscribe to receive broadcasts of real-time music streams from the influencer user (e.g., of influencer device 130) and/or from one or more other influencer users (e.g., of influencer devices 135). The one or more additional influencer devices 135 may be similar to influencer device 130, for example, but may be used by other influencer users different from the influencer user who may use influencer device 130.

Additionally or alternatively, listener device 140 may be a computing device, such as a mobile computing device (e.g., a smartphone, tablet computer, and/or other type of mobile device), used by a listener user of a music sharing platform (which may, e.g., be provided by music sharing computing platform 105). Listener device 140 may, for example, store music stream playback software, and the listener user (who may, e.g., use listener device 140) may use the playback software to receive and play music streams (which may, e.g., be broadcast by one or more influencer devices and/or users of such devices via music sharing computing platform 105). The one or more additional listener devices 145 may be similar to listener device 140, for example, but may be used by other listener users different from the listener user who may use listener device 140.

Figure 2:
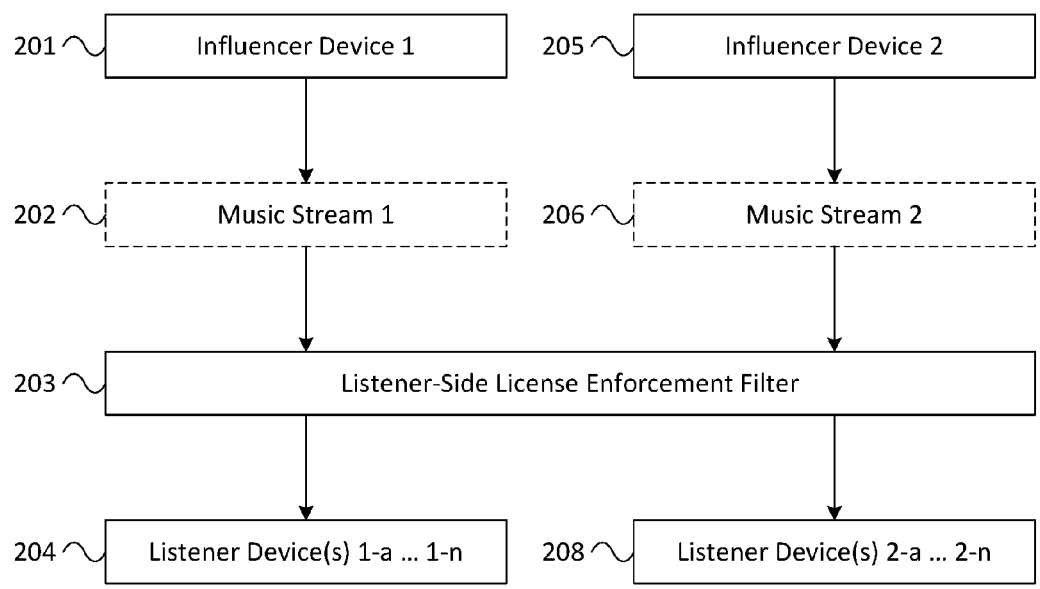
FIG. 2 depicts an example of multiple influencer devices sharing music streams with a plurality of listener devices in accordance with one or more example embodiments.

FIG. 2 depicts an example of multiple influencer devices sharing music streams with a plurality of listener devices in accordance with one or more example embodiments. As seen in FIG. 2, a first influencer device 201 may create a first music stream 202, for instance, as the user of influencer device 201 utilizes music playback software loaded on the first influencer device 201 to play back one or more songs included in a music library stored on the first influencer device 201. Data associated with the first music stream 202 may be received by music sharing computing platform 105 and broadcast to and/or otherwise shared with a first set of one or more listener devices 204. In some instances, the data associated with the first music stream 202 may include streaming audio content of the song(s) being played back by influencer device 201, while in other instances, the data associated with the first music stream 202 might only include meta-data identifying the song(s) being played back by influencer device 201 and/or other non-content data associated with such song(s), such as time counter information identifying a current playback point in the song(s) being played back by influencer device 201.

In sharing the first music stream 202 with the first set of one or more listener devices 204, music sharing computing platform 105 may enforce one or more license restrictions on the first music stream 202 using a listener-side license enforcement filter 203. Listener-side license enforcement filter 203 may, for example, include one or more programs and/or program modules stored by and/or executed by music sharing computing platform 105 to enforce one or more license restrictions as various different listener devices receive various different music streams from various difference influencer devices for playback, as discussed in greater detail below. For example, in addition to enforcing license restrictions on the first music stream 202 that is created by the first influencer device 201 and subscribed to and/or played by the first set of one or more listener devices 204, music sharing computing platform 105 and/or listener-side license enforcement filter 203 may similarly enforce license restrictions on a second music stream 206 that is created by a second influencer device 205 and subscribed to and/or played by a second set of one or more listener devices 208. Significantly, music sharing computing platform 105 and/or listener-side license enforcement filter 203 may enforce one or more license restrictions on the playback of the music streams by the various listener devices even though the various influencer devices might not enforce such license restrictions or take any steps towards enforcing such license restrictions. Rather, the users of the various influencer devices may simply play back audio content from their music libraries without concerning themselves with enforcing license restrictions, as the enforcement of license restrictions on the various listener devices may be handled automatically by music sharing computing platform 105 and/or listener-side license enforcement filter 203, as illustrated in the examples discussed in greater detail below, when sharing the music streams created by the influencer devices with the listener devices.

In one or more arrangements, music sharing computing platform 105 and/or listener-side license enforcement filter 203 may enforce various license restrictions (e.g., as may be desired in particular implementations and/or configurations) by selectively allowing certain listener devices to receive and/or play back one or more songs that are part of a particular music stream created by a particular influencer device while selectively preventing certain other listener devices from receiving and/or playing back such songs. In particular, music sharing computing platform 105 and/or listener-side license enforcement filter 203 may determine which listener devices may receive and/or play back a certain song and/or which listener devices may not receive and/or playback the particular song by determining, with respect to each particular listener device, if playback of the particular song would comply with or violate one or more license restrictions, such as one or more Digital Millennium Copyright Act (DMCA) license restrictions. For example, in some arrangements, music sharing computing platform 105 and/or listener-side license enforcement filter 203 may be configured to enforce one or more DMCA license restrictions, such as one or more DMCA license restrictions associated with playback of internet radio stations, on playback of various real-time music streams by various listener devices, so as to ensure that each individual listener device complies with all relevant license restrictions, even though different listener devices may join different streams at different times and/or may individually encounter other unique circumstances with respect to the same and/or different music streams that may affect whether a particular listener device can play back a particular song from a particular music stream at a particular time.

Figure 3:
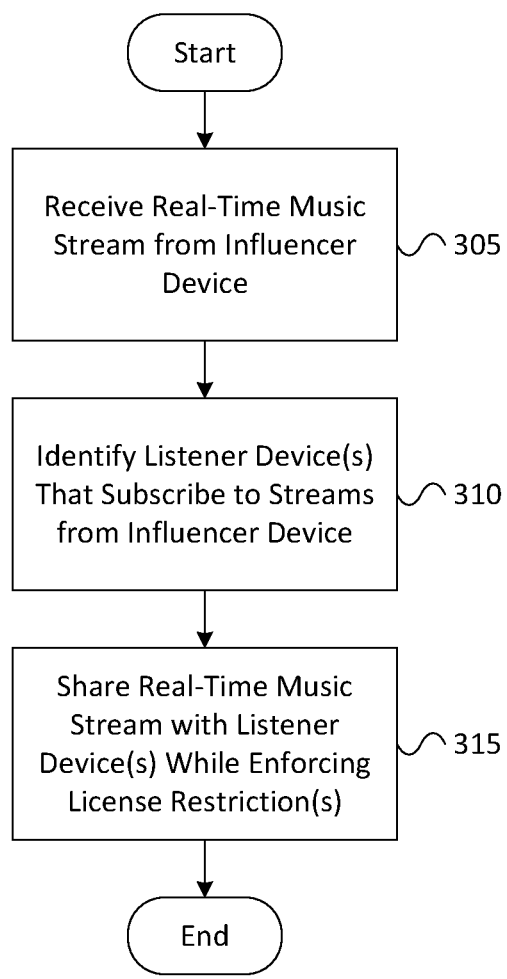
FIG. 3 depicts an illustrative method for sharing music streams and enforcing license restrictions in accordance with one or more example embodiments.

FIG. 3 depicts an illustrative method for sharing music streams and enforcing license restrictions in accordance with one or more example embodiments. In some embodiments, the example method illustrated in FIG. 3 may be performed by a computing platform, such as music sharing computing platform 105, in sharing music streams from one or more influencer devices with one or more listener devices while enforcing license restrictions on playback of the music streams by the listener devices. Additionally or alternatively, the example method illustrated in FIG. 3 may be embodied in computer-readable instructions that may be executed by one or more processors.

Referring to FIG. 3, at step 305, a computing platform (e.g., music sharing computing platform 105) may receive data associated with a real-time music stream from an influencer device. For example, at step 305, music sharing computing platform 105 may receive data associated with a real-time music stream from an influencer device (e.g., influencer device 130) as the influencer device initiates playback of a particular song or playlist from a music library stored by the influencer device. As noted above, in some instances, the data associated with the real-time music stream (which may, e.g., be received by music sharing computing platform 105) may include streaming audio content of the particular song being played by the influencer device, while in other instances, the data associated with the real-time music stream might only include meta-data for the particular song being played by the influencer device and/or other non-content information associated with the particular song. For example, as music playback software on the influencer device begins playing back the song to the user of the influencer device, the influencer device may send, in real-time, the song being played back and/or other information associated with playback of the song, such as a time counter value (which may, e.g., be updated as the influencer device plays back the song), the name of the song, the artist performing the song, and/or other information associated with the song.

At step 310, the computing platform (e.g., music sharing computing platform 105) may identify a plurality of listener devices that subscribe to one or more music streams from the influencer device. For example, at step 310, music sharing computing platform 105 may identify a plurality of listener devices (e.g., listener device 140, listener devices 145, etc.) that may subscribe to receive music streams from influencer device 130.

At step 315, the computing platform (e.g., music sharing computing platform 105) may share the real-time music stream with the plurality of listener devices while enforcing one or more license restrictions separately for each listener device of the plurality of listener devices. For example, at step 315, music sharing computing platform 105 may share the music stream with the one or more listener devices simultaneously, substantially contemporaneously, and/or in near real-time as the influencer device (e.g., influencer device 130) is playing back the music stream (e.g., and as the user of the influencer device is experiencing the music stream). For instance, the music stream shared with and/or played back by the one or more listener devices (e.g., listener device 140) may be synchronized as closely as possible with the music stream being created and/or played back by the influencer device (e.g., influencer device 130). In this way, music sharing computing platform 105 may enable the plurality of listener devices and the users of such devices to experience the same music content as the influencer device and the user of the influencer device at nearly the same time. By sharing music in this nearly contemporaneous way, users of the listener devices may share in the feeling of the user of the influencer device in a particular moment by experiencing the same music that the user of the influencer device is listening to and/or experiencing at a given moment. In addition, as the influencer device plays back different songs over the music stream, and as various listener devices join the music stream and/or switch between different music streams, music sharing computing platform 105 may track which songs are being played back at which times on which listener devices to ensure that all music playback by all listener devices complies with any and/or all applicable license restrictions. In particular, music sharing computing platform 105 may enforce license restrictions individually for each listener device, as different listener devices may be affected by different restrictions at different times and/or with respect to different songs and/or music streams.

In some instances, when a user of a particular listener device switches to a new music stream (which may, e.g., be created by a different influencer device and/or influencer user of such an influencer device), music sharing computing platform 105 may reset the enforcement of license restrictions with respect to the particular listener device. For example, when switching between music streams provided by different influencer devices, the songs being played on the previous music stream might not count towards the license restrictions to be enforced when listening to the new music stream, as the new music stream essentially may be treated as a new internet radio station. In other instances, however, the songs being played on a previous music stream may count towards the license restrictions to be enforced when listening to a new music stream. For example, if a particular listener device is automatically switched from one music stream to another by music sharing computing platform 105 to ensure compliance with one or more license restrictions, the song(s) being played on the initial music stream may be taken into account by music sharing computing platform 105 when enforcing one or more license restrictions on audio playback by the particular listener device.

In some embodiments, a first listener device of the plurality of listener devices may join the real-time music at a first time when a first song is playing, and a second listener device of the plurality of listener devices may join the real-time music stream at a second time when a second song different from the first song is playing. For example, different listener devices may join and leave a particular music stream at different times. As a result, different listener devices may be subject to, experience, and/or encounter different license restrictions at different times with respect to the same music stream. Music sharing computing platform 105 may track each individual listener device and enforce license restrictions individually for each listener device to ensure that each listener device complies with any and/or all applicable license restrictions. In this way, the burden of complying with license restrictions might not be placed on the influencer device or the user of the influencer device. Instead, the user of the influencer device can simply play back whichever songs he or she chooses, and various listener devices may subscribe to, receive, and/or playback such songs if they are allowed to do so by music sharing computing platform 105, for instance.

In some embodiments, sharing the real-time music stream with the plurality of listener devices may include allowing a first set of listener devices to play the real-time music stream while preventing a second set of listener devices from playing the real-time music stream. For example, in sharing the real-time music stream from a particular influencer device, music sharing computing platform 105 may transmit the stream received from the influencer device to some listener devices to enable playback of the song currently playing on the music stream, while also preventing other listener devices from receiving the stream and/or playing back the particular song that is currently playing on the music stream. In some instances, the listener devices that are prevented from receiving a particular song and/or a particular music stream may experience different music content and/or no music content.

In some embodiments, in sharing the real-time music stream with the plurality of listener devices, the music sharing computing platform may allow a first listener device of the plurality of listener devices to play a first song of the real-time music stream. Subsequently, the music sharing computing platform may detect that a second song is starting on the real-time music stream. In response to detecting that the second song is starting on the real-time music stream, the music sharing computing platform may prevent the first listener device of the plurality of listener devices from playing the second song. For example, the music sharing computing platform may prevent the first listener device from playing the second song based on one or more license restrictions being encountered by the first listener device with respect to playback of the second song at that particular point in time. Subsequently, the music sharing computing platform may detect that a third song is starting on the real-time music stream. In response to detecting that the third song is starting on the real-time music stream, the music sharing computing platform may allow the first listener device of the plurality of listener devices to play the third song of the real-time music stream. As illustrated in this example, in some instances, the listener devices that are prevented from receiving a particular music stream at one point in time may be able to rejoin the music stream at a different point in time (e.g., after a different song comes on for which playback by the particular listener devices would comply with applicable license restrictions).

Figure 4:
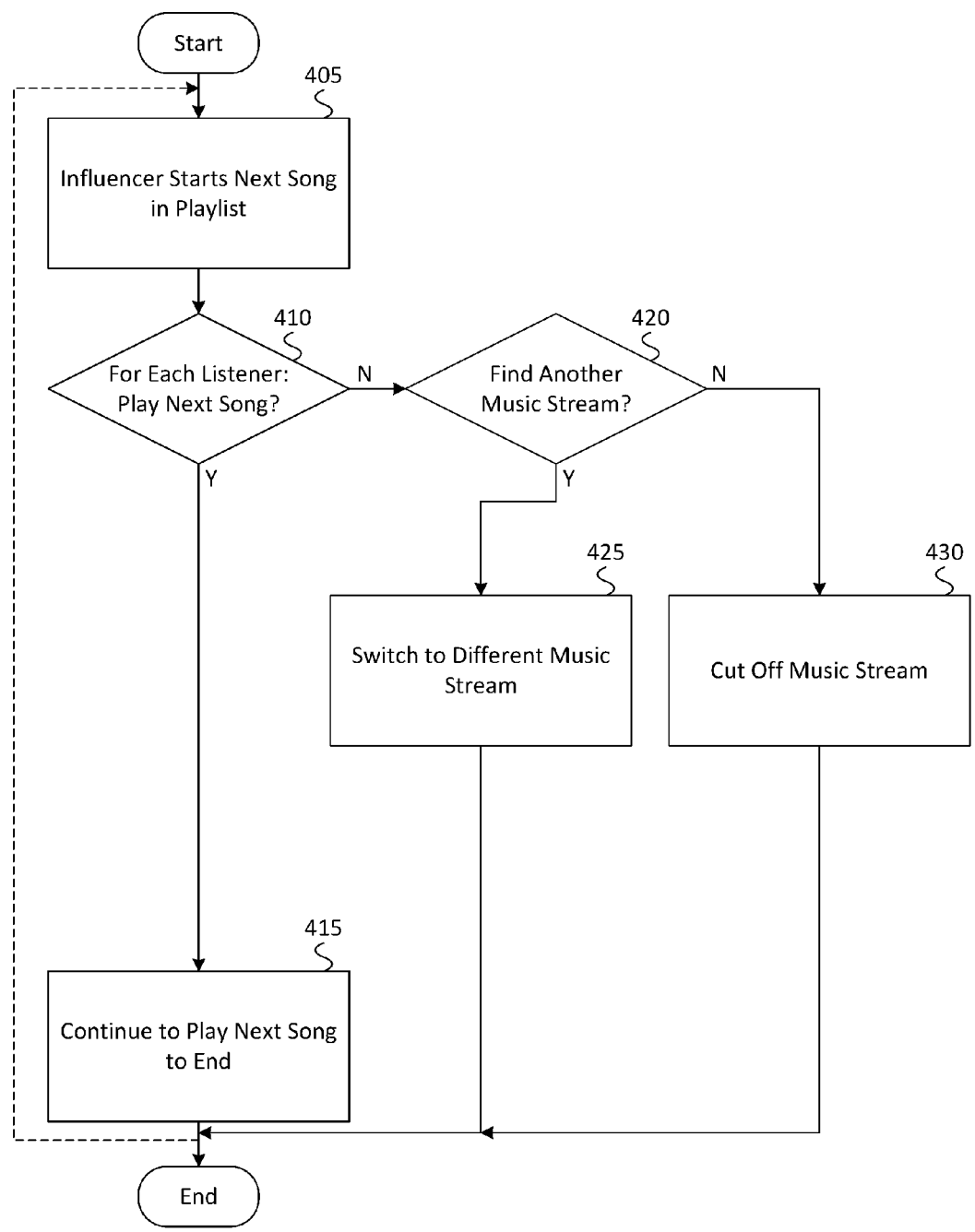
FIG. 4 depicts another illustrative method for sharing music streams and enforcing license restrictions in accordance with one or more example embodiments.

FIG. 4 depicts another illustrative method for sharing music streams and enforcing license restrictions in accordance with one or more example embodiments. In some embodiments, the example method illustrated in FIG. 4 may be performed by a computing platform, such as music sharing computing platform 105, in sharing music streams from one or more influencer devices with one or more listener devices while enforcing license restrictions on playback of the music streams by the listener devices. Additionally or alternatively, the example method illustrated in FIG. 4 may be embodied in computer-readable instructions that may be executed by one or more processors.

Referring to FIG. 4, at step 405, music sharing computing platform 105 may detect that an influencer device has started playback of a new song and/or the next song in a playlist. At step 410, music sharing computing platform 105 may determine, for each listener device that is currently receiving the music stream from the influencer device whether playback of the new song would violate any applicable license restrictions, such as the example DMCA license restrictions identified below. If playback of the new song would not violate any applicable license restrictions for a particular listener device, then music sharing computing platform 105 may allow the particular listener device to continue receiving the music stream and play back the new song until its end at step 415. Alternatively, if playback of the new song would violate a license restriction for the particular listener device, then music sharing computing platform 105 may determine if the listener device can be switched to a different music stream at step 420. If the particular listener device can be switched to a different music stream, then music sharing computing platform 105 may switch the particular listener device to a different music stream at step 425. For example, at step 425, music sharing computing platform 105 may automatically switch the particular listener device to a music stream in which the song that is currently playing would not violate any license restrictions with respect to the particular listener device. Alternatively, if the particular listener device cannot be switched to a different music stream, then music sharing computing platform 105 may cut off the particular listener device from playback of the music stream from the influencer device at step 430. As indicated above, music sharing computing platform 105 may evaluate these considerations with respect to each listener device receiving the music stream from the influencer device. In addition, these considerations may be reevaluated by music sharing computing platform 105 once playback of the new song completes and/or the influencer device initiates playback of yet another new song.

In one or more arrangements, the DMCA license restrictions that may be enforced (e.g., by music sharing computing platform 105 on playback of a particular music stream by one or more listener devices) may include:
  a. Specific sound recordings may not be played within one hour of a request by a listener or at a time specifically designated by the listener.
  b. In a three-hour period, no more than three tracks from a given album may be played.
  c. In a three-hour period, no more than four tracks by a given artist or from a boxed set may be played.
  d. No more than two tracks from a given album may be played consecutively.
  e. No more than three tracks by a given artist or from a boxed set may be played consecutively.
  f. A channel duration is at least three hours and may not be fully looped and played again until the user has listened for three hours.
  g. A listener should not be aware of the songs contained in the channel, when the songs will be played, or the order in which they will be played.
  h. Archived programs (i.e., channels that always starts at the same place and that allows users to start at any time) must be greater than five hours long and should not be available for more than two weeks at a time. For example, a thirty-minute playlist with a fixed start cannot be made available for repeated play and a six-hour playlist can be made available for repeated play, but not indefinitely.

Figure 5A:
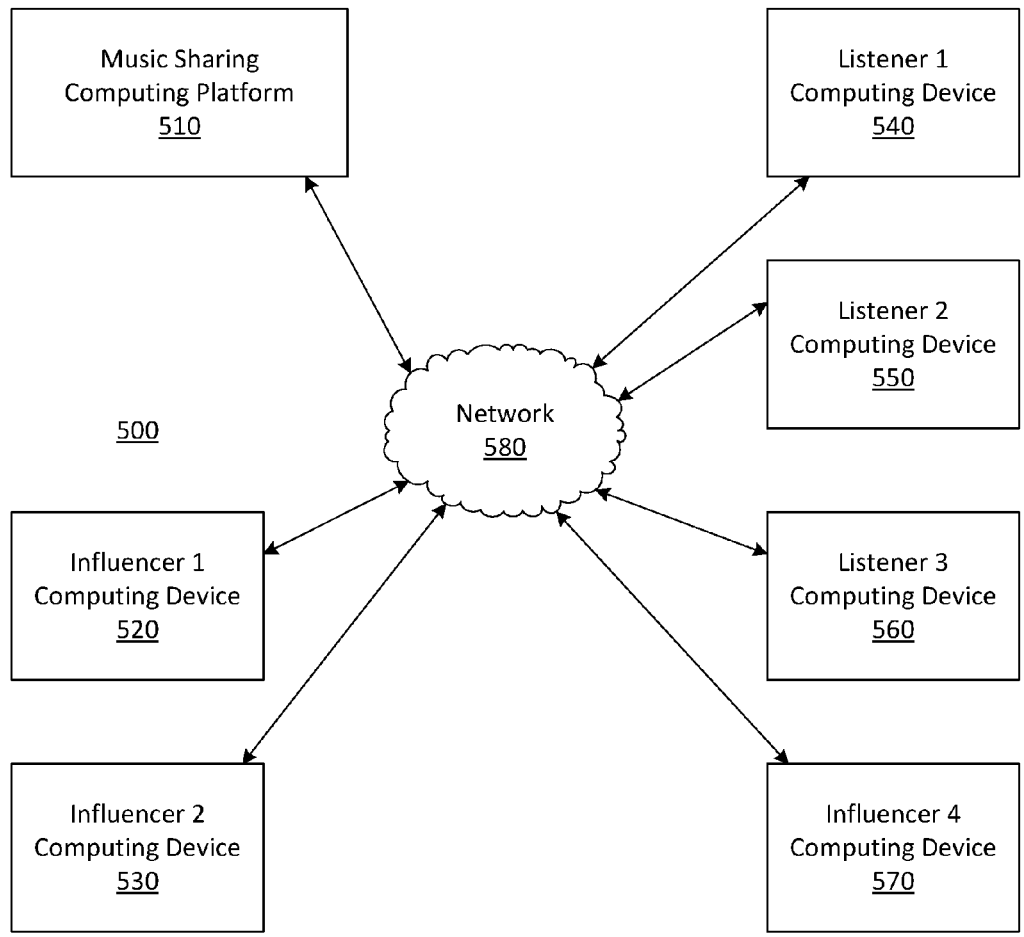
FIGS. 5A and 5B depict an illustrative computing environment for streaming influencer device audio content to listener devices in accordance with one or more example embodiments.
Figure 5B:
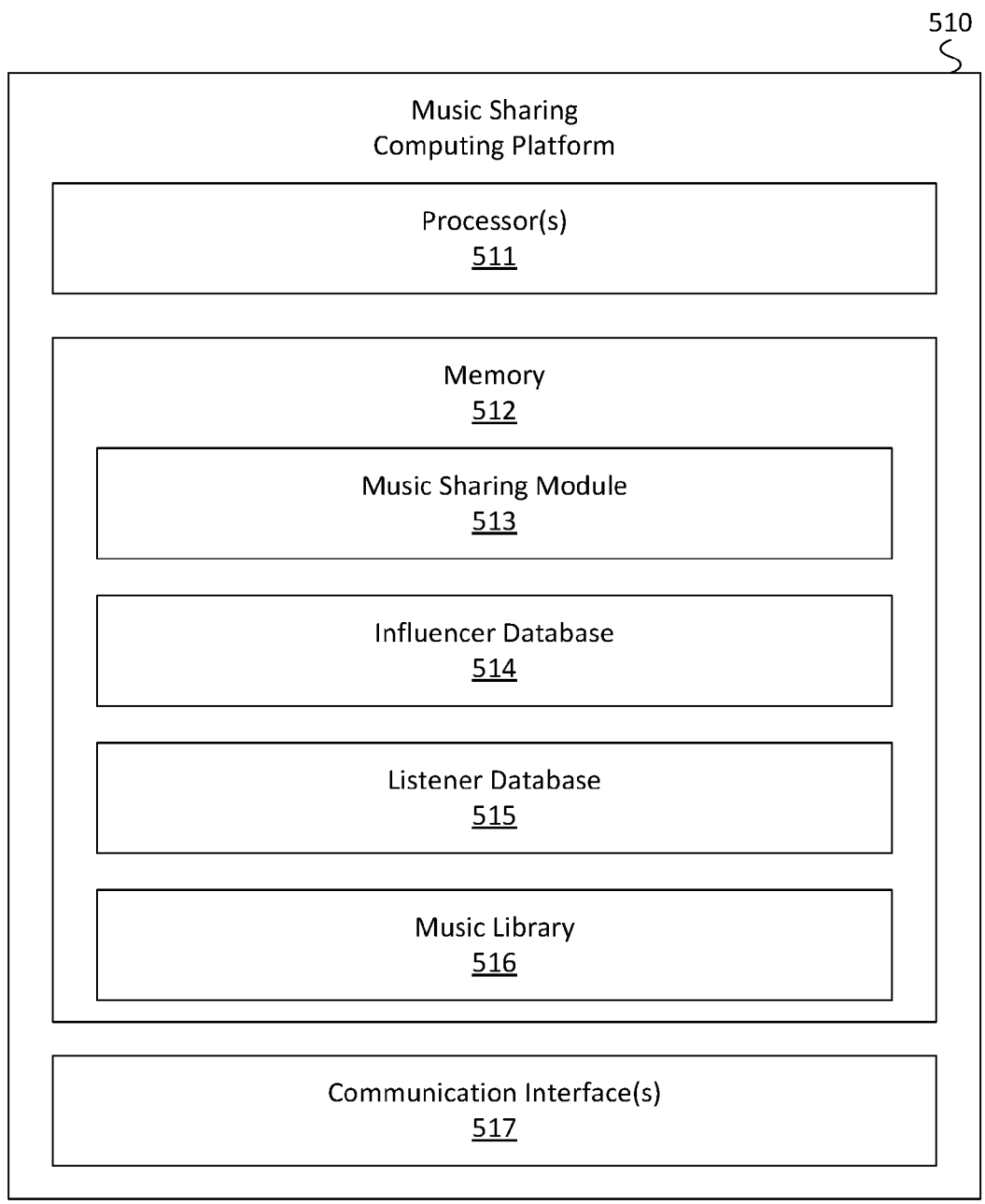

FIGS. 5A and 5B depict an illustrative computing environment for streaming influencer device audio content to listener devices in accordance with one or more example embodiments. Referring to FIG. 5A, computing environment 500 may include one or more computing devices, similar to computing environment 100. For example, computing environment 500 may include one or more influencer devices, including influencer computing device 520 and influencer computing device 530, and one or more listener devices, including listener computing device 540, listener computing device 550, listener computing device 560, and listener computing device 570. The one or more influencer devices, including influencer computing device 520 and influencer computing device 530, may be similar to and/or incorporate one or more aspects of the influencer devices discussed above. For example, influencer computing device 520 and/or influencer computing device 530 may be similar to and/or incorporate one or more aspects of influencer device 130 and/or influencer devices 135. In addition, the one or more listener devices, including listener computing device 540, listener computing device 550, listener computing device 560, and listener computing device 570, may be similar to and/or incorporate one or more aspects of the listener devices discussed above. For example, listener computing device 540, listener computing device 550, listener computing device 560, and listener computing device 570 may be similar to and/or incorporate one or more aspects of listener device 140 and/or listener devices 145.

Computing environment 500 also may include one or more computing platforms. For example, computing environment 500 may include music sharing computing platform 510. Music sharing computing platform 510 may be similar to and/or incorporate one or more aspects of the music sharing computing platforms discussed above. For example, music sharing computing platform 510 may be similar to and/or incorporate one or more aspects of music sharing computing platform 105.

Computing environment 500 also may include one or more networks, which may interconnect one or more of music sharing computing platform 510, influencer computing device 520, influencer computing device 530, listener computing device 540, listener computing device 550, listener computing device 560, and listener computing device 570. For example, computing environment 500 may include network 580. Network 580 may be similar to and/or incorporate one or more aspects of the networks discussed above. For example, network 580 may be similar to and/or incorporate one or more aspects of network 125.

Referring to FIG. 5B, music sharing computing platform 510 may include one or more processors 511, memory 512, and at least one communication interface 517. A data bus may interconnect processor(s) 511, memory 512, and communication interface 517. Communication interface 517 may be a network interface configured to support communication between music sharing computing platform 510 and one or more networks (e.g., network 580, or the like).

Memory 512 may include one or more program modules having instructions that when executed by processor(s) 511 cause music sharing computing platform 510 to perform one or more functions described herein and/or one or more databases and/or libraries that may store and/or otherwise maintain information which may be used by such program modules and/or processor(s) 511. In some instances, the one or more program modules and/or databases and/or libraries may be stored by and/or maintained in different memory units of music sharing computing platform 510 and/or by different computing devices that may form and/or otherwise make up music sharing computing platform 510. For example, memory 512 may include a music sharing module 513, an influencer database 514, a listener database 515, and a music library 516. Music sharing module 513 may store instructions and/or perform one or more functions that enable and/or cause music sharing computing platform 510 to perform one or more functions described herein, including one or more functions that enable and/or cause music sharing computing platform 510 to receive music streams one or more influencer devices (e.g., influencer computing device 520 and influencer computing device 530) and share such music streams with one or more listener devices (e.g., listener computing device 540, listener computing device 550, listener computing device 560, and listener computing device 570). Influencer database 514 may store information associated with one or more influencer devices (e.g., influencer computing device 520 and influencer computing device 530), such as device registration information, and/or the users of such devices, such as user profile information. Listener database 515 may store information associated with one or more listener devices (e.g., listener computing device 540, listener computing device 550, listener computing device 560, and listener computing device 570), such as device registration information, and/or the users of such devices, such as user profile information. Music library 516 may store music files and/or other audio content (which may, e.g., be loaded and/or sent to one or more listener devices (e.g., listener computing device 540, listener computing device 550, listener computing device 560, and listener computing device 570) by music sharing computing platform 510 in sharing one or more music streams).

Figure 6A:
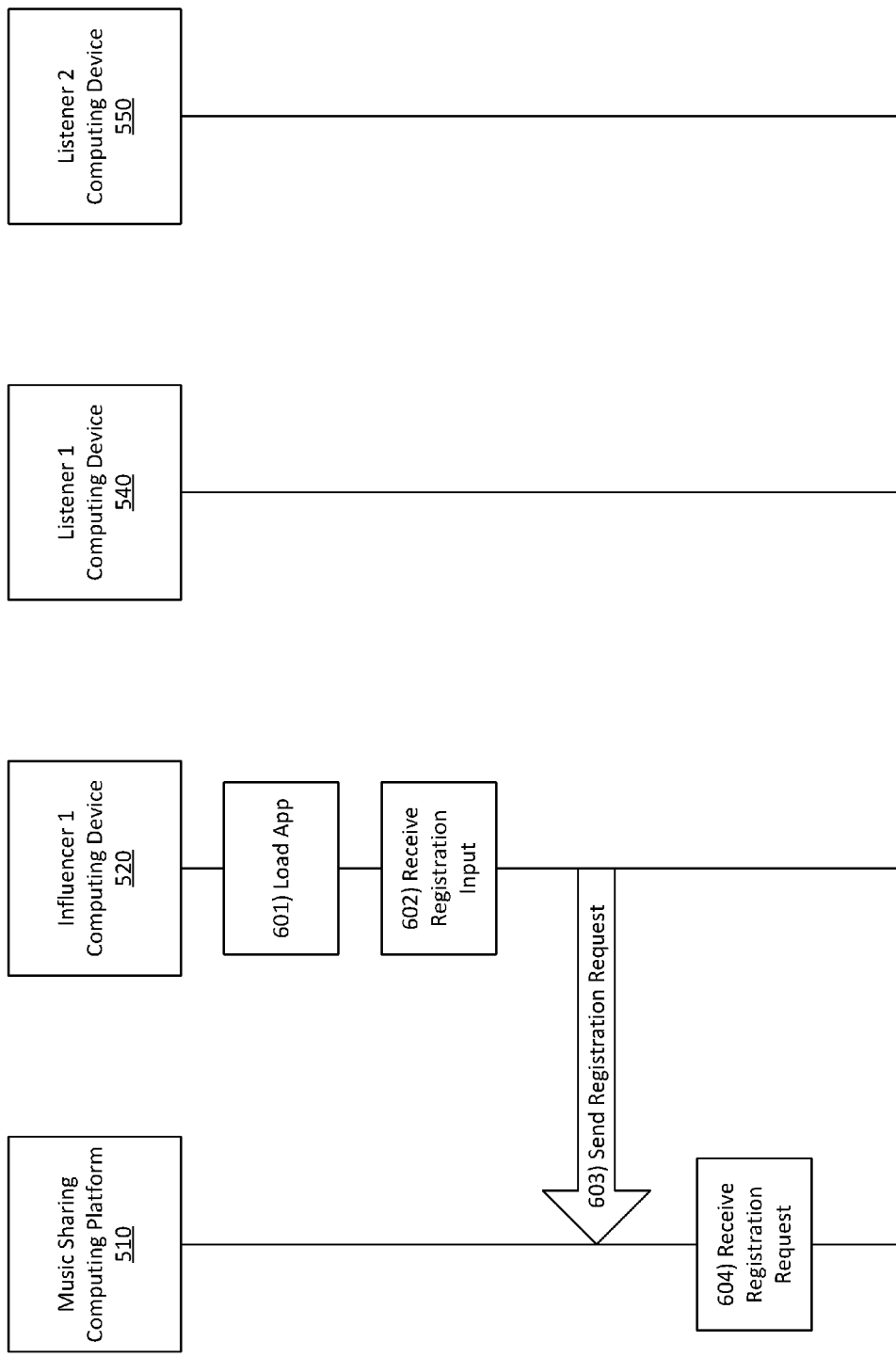
FIGS. 6A-6O depict an illustrative event sequence for streaming influencer device audio content to listener devices in accordance with one or more example embodiments.
Figure 6B:
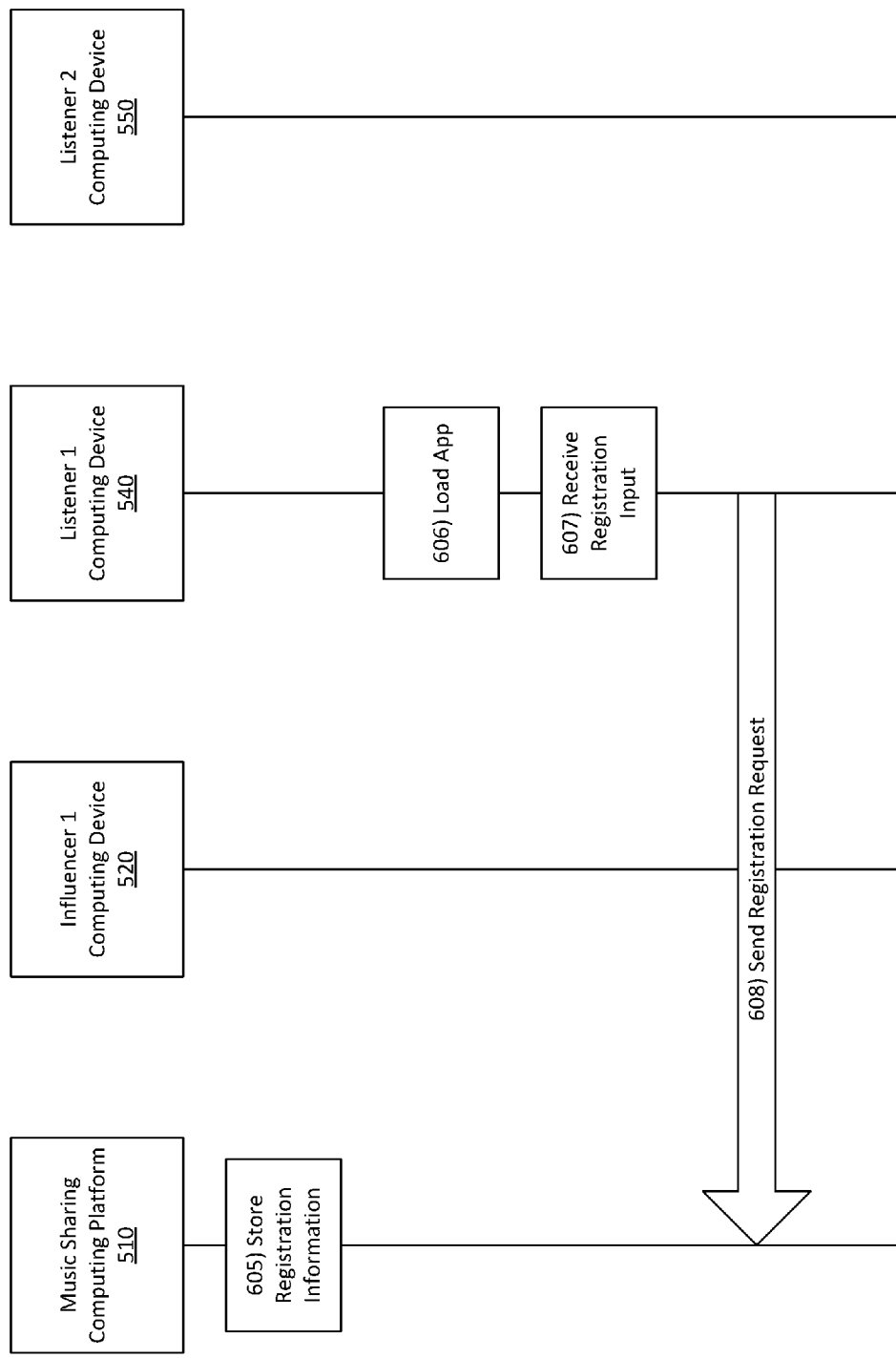
Figure 6C:
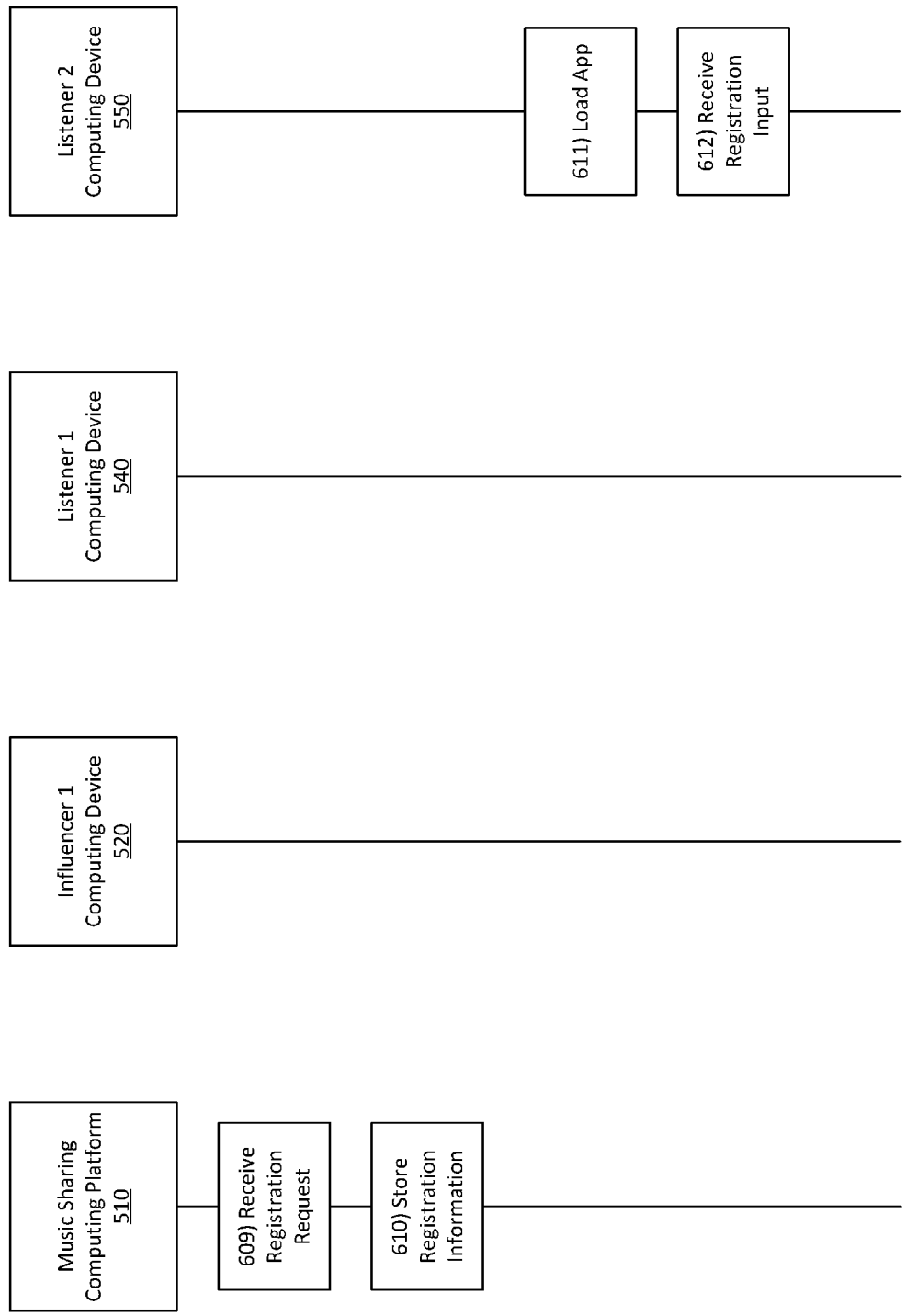
Figure 6D:
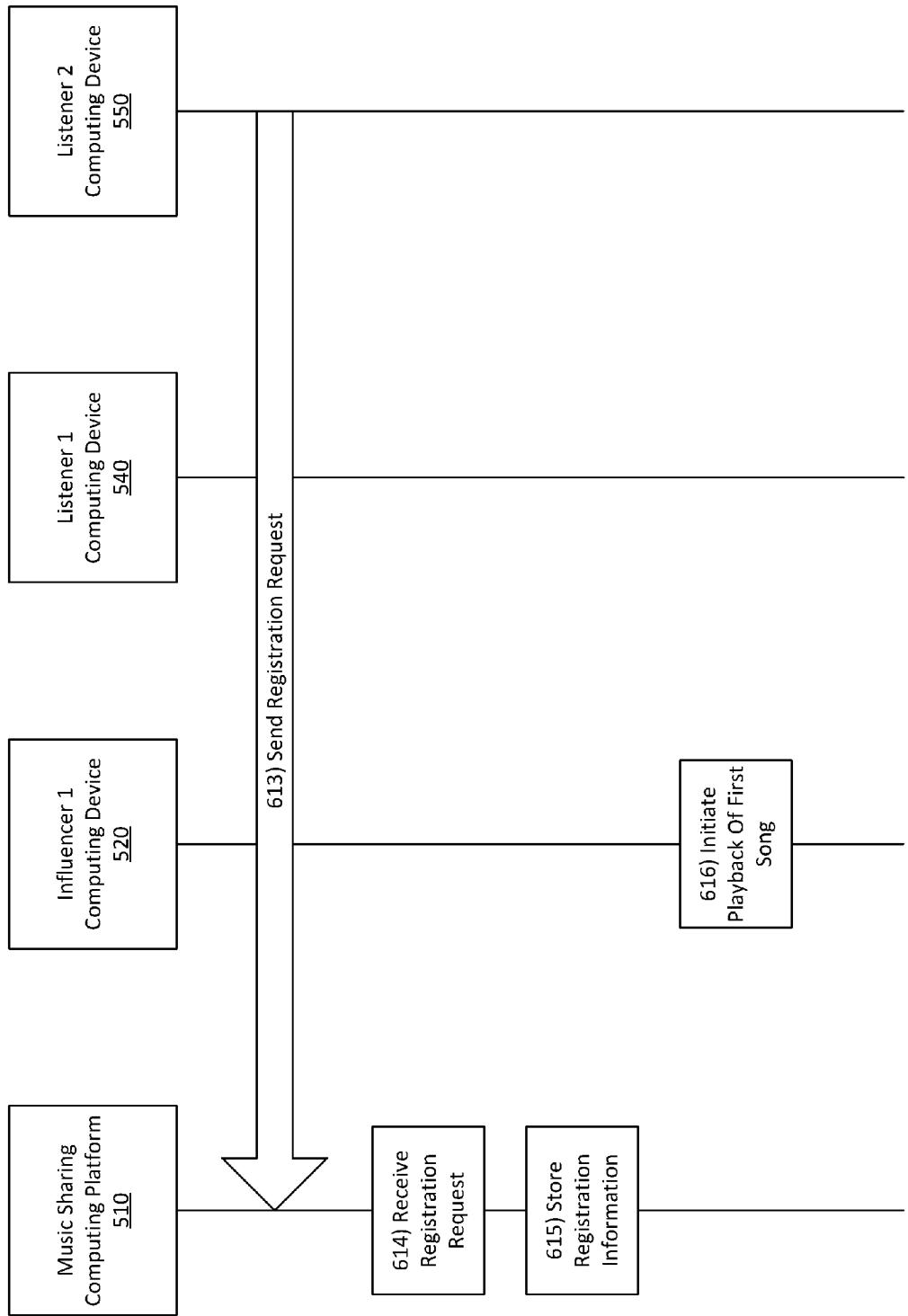
Figure 6E:
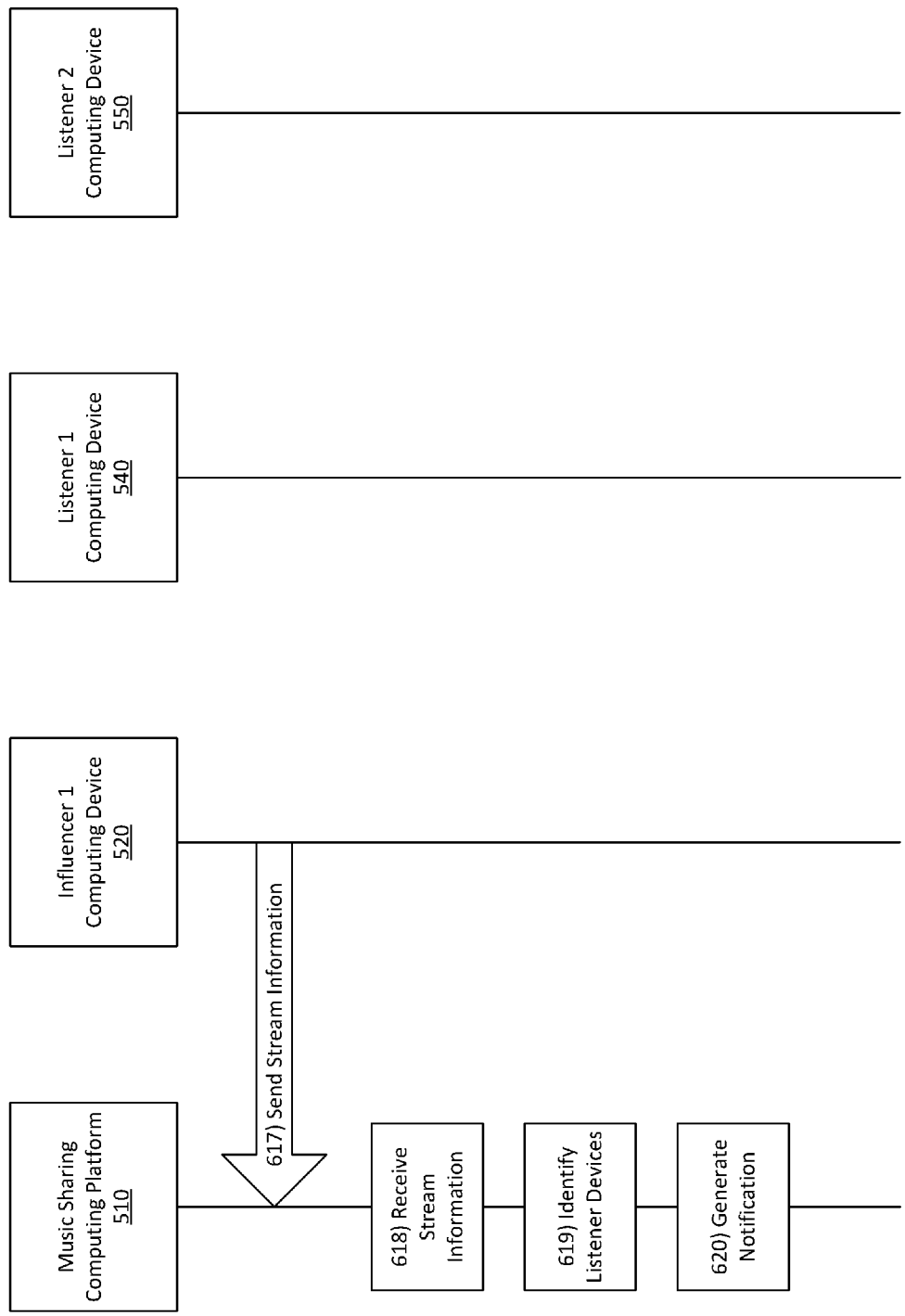
Figure 6F:
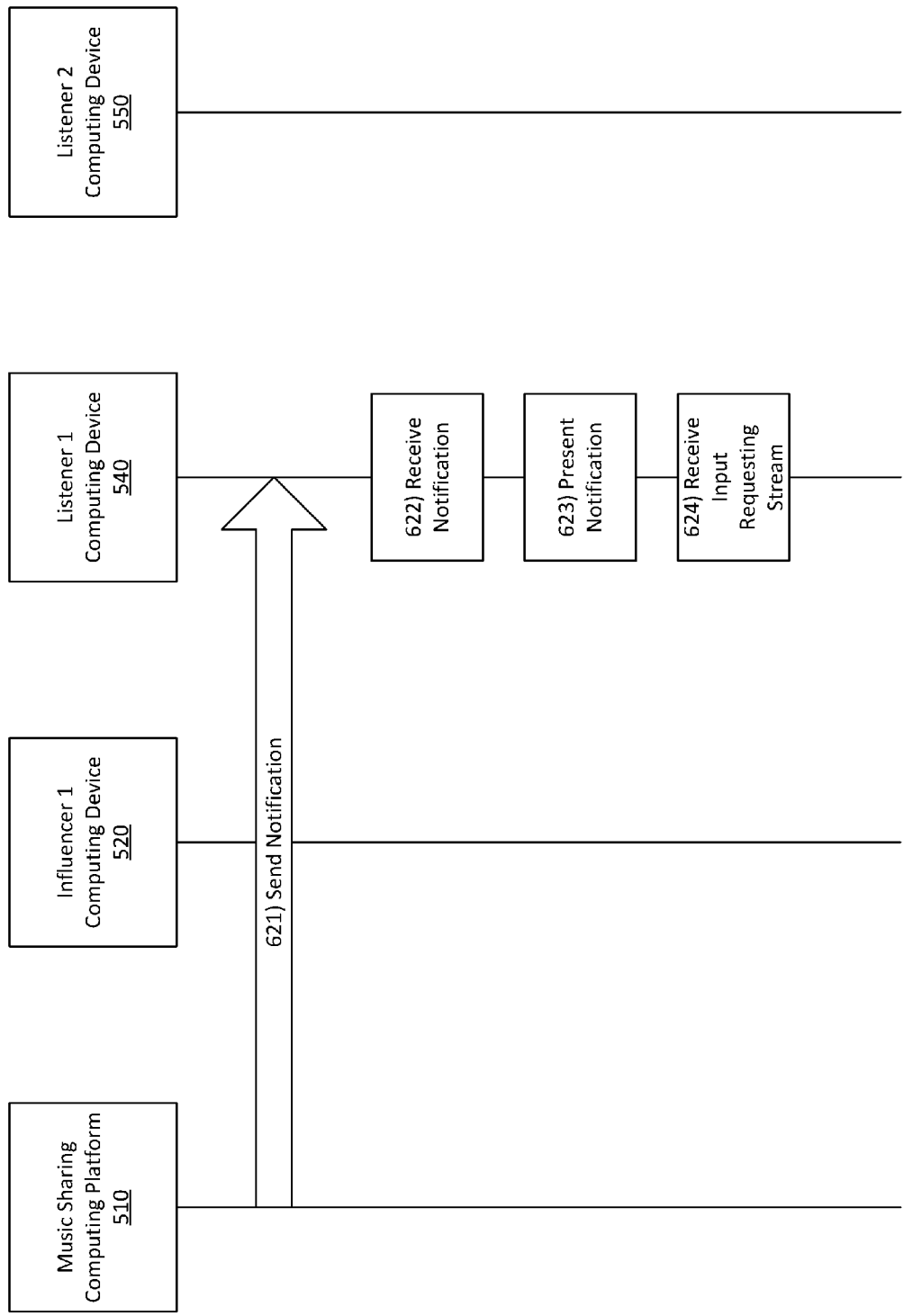
Figure 6H:
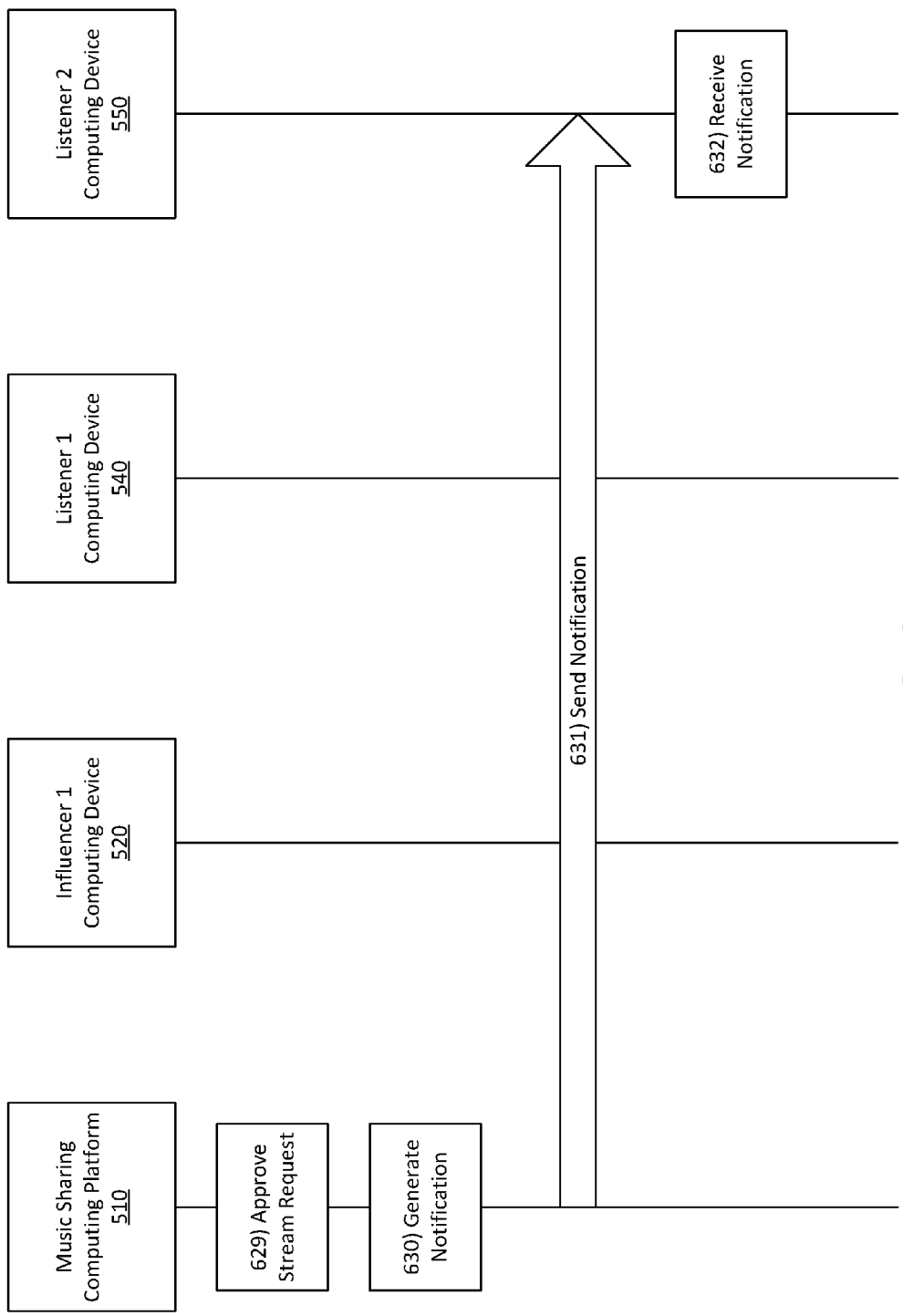
Figure 6I:
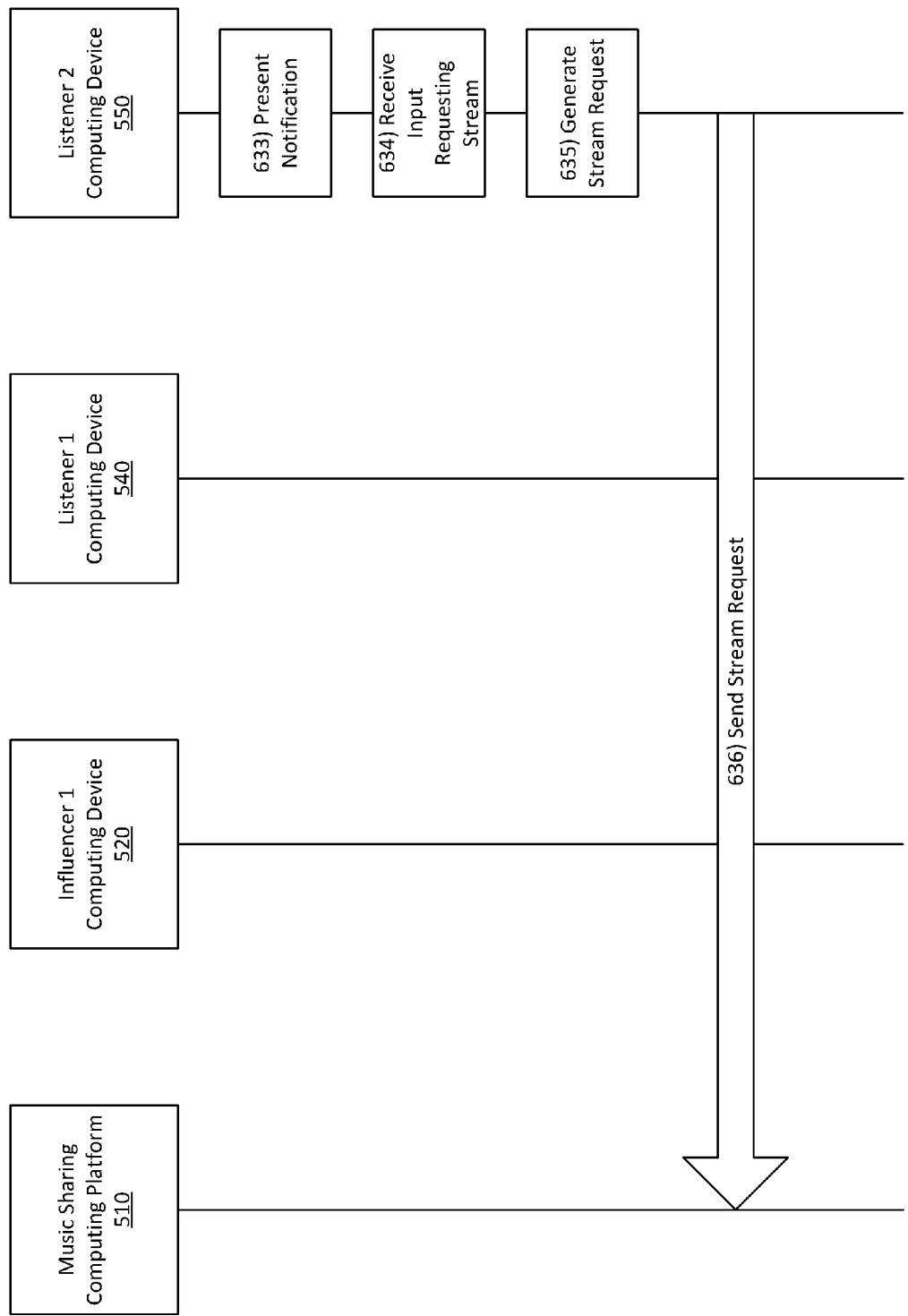
Figure 6K:
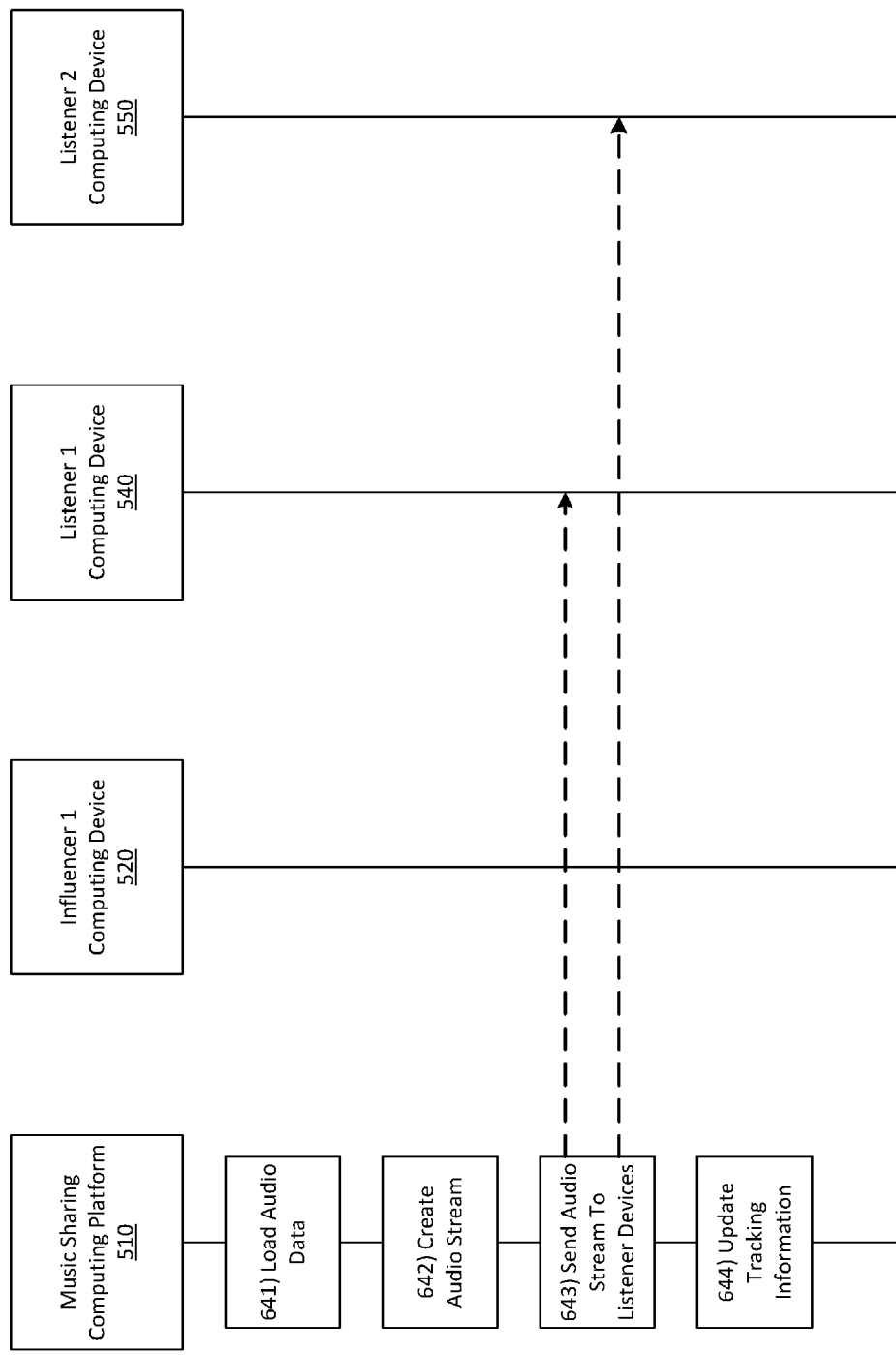
Figure 6N:
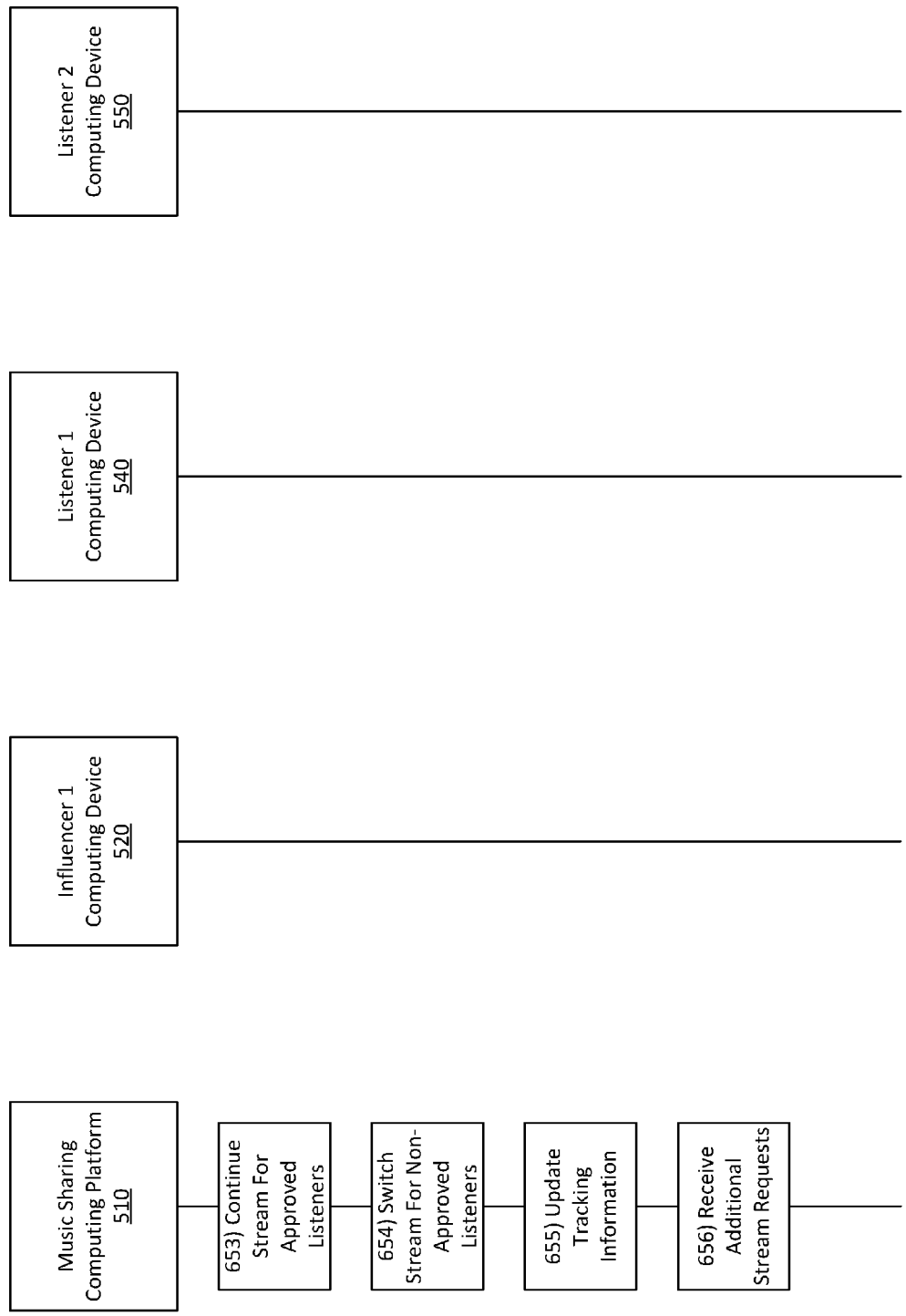
Figure 6O:
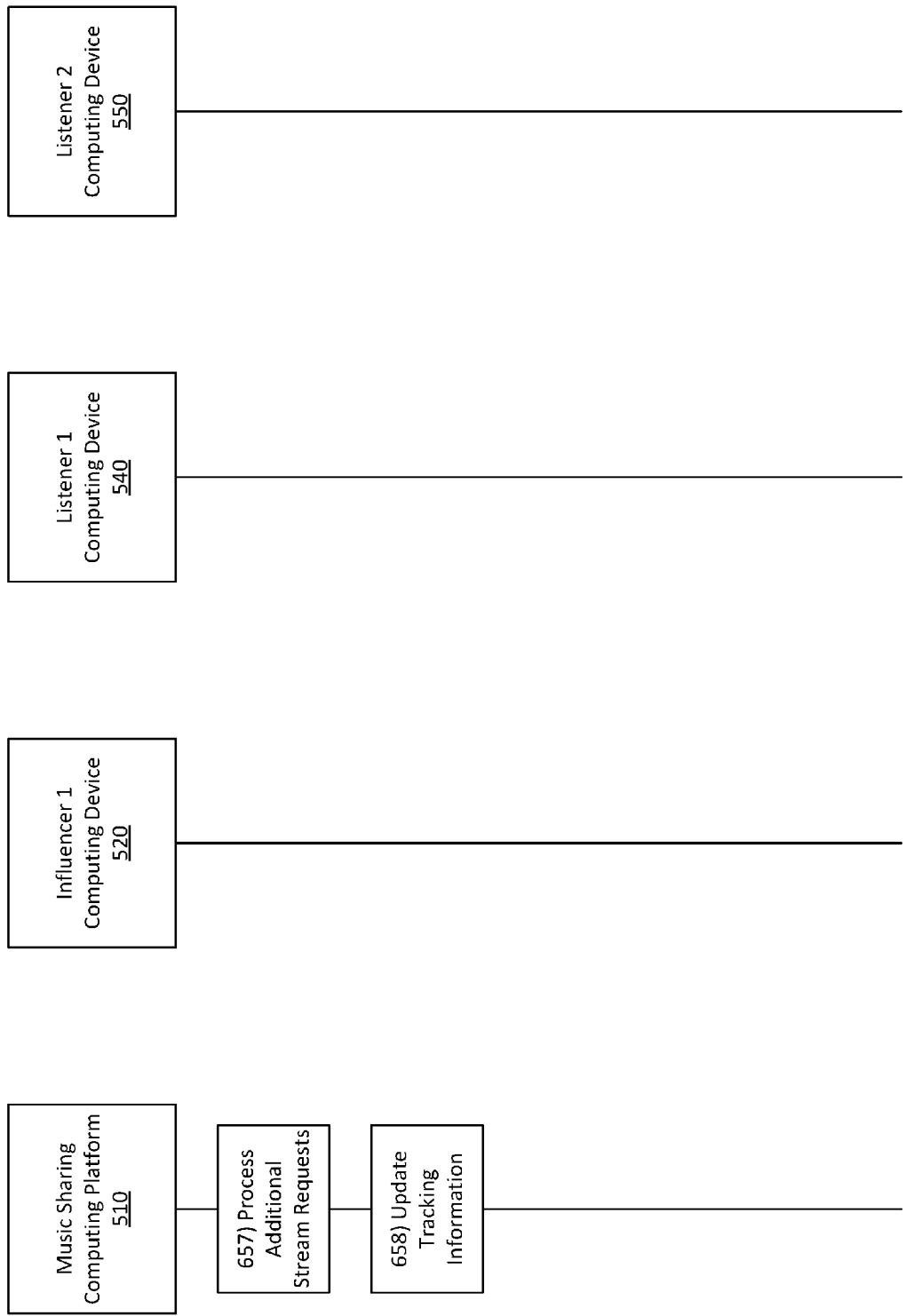

FIGS. 6A-6O depict an illustrative event sequence for streaming influencer device audio content to listener devices in accordance with one or more example embodiments. Although the steps of the event sequence are illustrated as occurring in a particular order, it should be understood that this order is one example of the order in which one or more steps may occur. In some embodiments, one or more steps of the event sequence may occur in a different order than illustrated, one or more additional steps may occur, and/or one or more might not occur.

Referring to FIG. 6A, at step 601, influencer computing device 520 may load a music streaming application. At step 602, influencer computing device 520 may receive registration input via the music streaming application. Such registration input may, for instance, include a request or command to register influencer computing device 520 with one or more servers (e.g., music sharing computing platform 510), so as to enable influencer computing device 520 to stream music and/or other audio content to one or more listener devices (e.g., listener computing device 540, listener computing device 550, listener computing device 560, and listener computing device 570). At step 603, influencer computing device 520 may send a registration request to music sharing computing platform 510 (e.g., based on the registration input received at step 602).

At step 604, music sharing computing platform 510 may receive the registration request from influencer computing device 520. For example, at step 604, music sharing computing platform 510 may receive, via the communication interface (e.g., communication interface 517), and from a first influencer device (e.g., influencer computing device 520), a first registration request. Referring to FIG. 6B, at step 605, music sharing computing platform 510 may store registration information for influencer computing device 520 (e.g., based on the registration request received from influencer computing device 520 at step 604). For example, at step 605, music sharing computing platform 510 may store registration information for the first influencer device (e.g., influencer computing device 520) based on the first registration request received from the first influencer device (e.g., influencer computing device 520). For instance, music sharing computing platform 510 may create and/or store device information associated with influencer computing device 520 and/or user profile information associated with a user of influencer computing device 520.

At step 606, listener computing device 540 may load a music streaming application. At step 607, listener computing device 540 may receive registration input. Such registration input may, for instance, include a username, password, device identifier, information identifying one or more streams to subscribe to, and/or other information. At step 608, listener computing device 540 may send a registration request to music sharing computing platform 510 (e.g., based on the registration input received at step 607).

Referring to FIG. 6C, at step 609, music sharing computing platform 510 may receive the registration request from listener computing device 540. For example, at step 609, music sharing computing platform 510 may receive, via the communication interface (e.g., communication interface 517), and from the first listener device of the plurality of listener devices (e.g., listener computing device 540), a second registration request. At step 610, music sharing computing platform 510 may store registration information for listener computing device 540 (e.g., based on the registration request received from listener computing device 540 at step 609). For example, at step 620, music sharing computing platform 510 may store registration information for the first listener device of the plurality of listener devices (e.g., listener computing device 540) based on the second registration request received from the first listener device of the plurality of listener devices (e.g., listener computing device 540). For instance, music sharing computing platform 510 may create and/or store device information associated with listener computing device 540 and/or user profile information associated with a user of listener computing device 540.

At step 611, listener computing device 550 may load a music streaming application. At step 612, listener computing device 550 may receive registration input. Such registration input may, for instance, include a username, password, device identifier, information identifying one or more streams to subscribe to, and/or other information. Referring to FIG. 6D, at step 613, listener computing device 550 may send a registration request to music sharing computing platform 510 (e.g., based on the registration input received at step 612).

At step 614, music sharing computing platform 510 may receive the registration request from listener computing device 550. For example, at step 614, music sharing computing platform 510 may receive, via the communication interface (e.g., communication interface 517), and from the second listener device of the plurality of listener devices (e.g., listener computing device 550), a third registration request. At step 615, music sharing computing platform 510 may store registration information for listener computing device 550 (e.g., based on the registration request received from listener computing device 550 at step 614). For example, at step 615, music sharing computing platform 510 may store registration information for the second listener device of the plurality of listener devices (e.g., listener computing device 550) based on the third registration request received from the second listener device of the plurality of listener devices (e.g., listener computing device 550). For instance, music sharing computing platform 510 may create and/or store device information associated with listener computing device 550 and/or user profile information associated with a user of listener computing device 550.

At step 616, influencer computing device 520 may initiate playback of a first song. For example, at step 616, influencer computing device 520 may begin playing a first song and/or other audio content within the music streaming application. Additionally or alternatively, the user of influencer computing device 520 may provide input requesting and/or commanding influencer computing device 520 to stream and/or otherwise share the first song and/or other audio content being played back by influencer computing device 520 with one or more listener devices that may follow and/or otherwise subscribe to receiving streams from influencer computing device 520. In some instances, the initiation of such streaming and/or sharing may be performed automatically by influencer computing device 520 and/or by the music streaming application running on influencer computing device 520, simply based on the user of influencer computing device 520 initiating playback of the first song and/or the other audio content.

Referring to FIG. 6E, at step 617, influencer computing device 520 may send stream information to music sharing computing platform 510. For example, at step 617, influencer computing device 520 may send stream information to music sharing computing platform 510 based on the initiation of the playback of the first song. Such stream information may, for instance, identify the first song and/or include time counter information indicating a current time position within the first song (which may, e.g., be updated by influencer computing device 520 in real-time as playback of the first song proceeds on influencer computing device 520). Additionally or alternatively, such stream information may, for instance, include actual audio data of the first song to enable playback by one or more other devices.

At step 618, music sharing computing platform 510 may receive the stream information from influencer computing device 520. For example, at step 618, music sharing computing platform 510 may receive, via the communication interface (e.g., communication interface 517), and from a first influencer device (e.g., influencer computing device 520), first stream information associated with a first real-time music stream. In some embodiments, the first real-time music stream may be defined by one or more playback selections made by a user of the first influencer device. For example, the first real-time music stream (which may, e.g., be received by music sharing computing platform 510 from influencer computing device 520) may be defined by one or more playback selections made by a user of the first influencer device (e.g., influencer computing device 520).

In some embodiments, the first stream information associated with the first real-time music stream received from the first influencer device may include metadata associated with a first song being played back by the first influencer device. For example, the first stream information associated with the first real-time music stream received (e.g., by music sharing computing platform 510) from the first influencer device (e.g., influencer computing device 520) may include metadata associated with a first song being played back by the first influencer device (e.g., influencer computing device 520). Such metadata may, for instance, include information identifying the first song (e.g., song title, unique identifier, and/or the like) and a time counter identifying the current playback position of influencer computing device 520 within the first song.

Additionally or alternatively, the first stream information associated with the first real-time music stream received from the first influencer device may include audio data associated with a first song being played back by the first influencer device. For example, the first stream information associated with the first real-time music stream received (e.g., music sharing computing platform 510) from the first influencer device (e.g., influencer computing device 520) may include audio data associated with a first song being played back by the first influencer device (e.g., influencer computing device 520). Such actual audio data may be and/or include the actual audio data of the first song being played back by influencer computing device 520, such as waveform audio data, compressed audio data (e.g., MP3 audio data), and/or the like.

At step 619, music sharing computing platform 510 may identify one or more listener devices to receive the music stream associated with the stream information received from influencer computing device 520. For example, at step 619, based on receiving the first stream information associated with the first real-time music stream from the first influencer device (e.g., influencer computing device 520), music sharing computing platform 510 may identify a plurality of listener devices that subscribe to receive music streams from the first influencer device (e.g., influencer computing device 520). For instance, based on follower information identifying the listeners that follow and/or subscribe to streams from influencer computing device 520, music sharing computing platform 510 may, at step 619, identify listener computing device 540 and listener computing device 550 as being listener devices to receive the music stream associated with the stream information received from influencer computing device 520. Such information may, for instance, be defined and/or stored by music sharing computing platform 510 based on previously received and/or stored registration information and/or other preferences information for listener computing device 540 and listener computing device 550.

At step 620, music sharing computing platform 510 may generate a notification for listener computing device 540. For example, at step 620, music sharing computing platform 510 may generate a notification for listener computing device 540 indicating that the music stream associated with influencer computing device 520 is available, based on listener computing device 540 subscribing to music streams from influencer computing device 520.

Referring to FIG. 6F, at step 621, music sharing computing platform 510 may send the notification to listener computing device 540. For example, at step 621, music sharing computing platform 510 may send, via the communication interface (e.g., communication interface 517), and to the first listener device of the plurality of listener devices (e.g., listener computing device 540), a first notification indicating that the first real-time music stream has started. In some instances, music sharing computing platform 510 may send the notification (e.g., to listener computing device 540)

via a push notification service associated with a mobile operating system of the first listener device (e.g., listener computing device 540).

Figure 7:
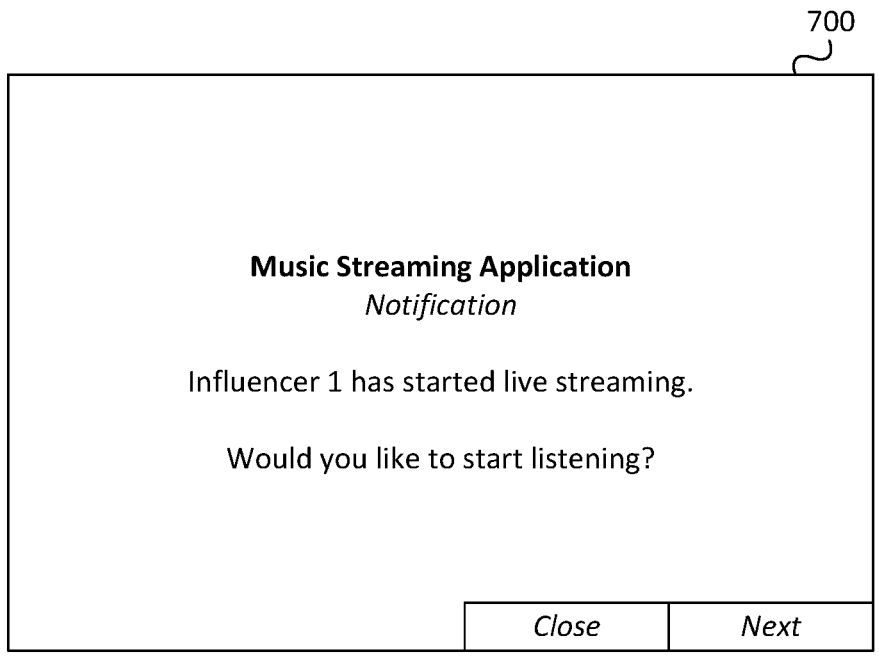
FIGS. 7-12 depict example graphical user interfaces for streaming influencer device audio content to listener devices in accordance with one or more example embodiments.

At step 622, listener computing device 540 may receive the notification from music sharing computing platform 510. For instance, listener computing device 540 may receive the push notification music sharing computing platform 510 via a push notification service associated with a mobile operating system of listener computing device 540. At step 623, listener computing device 540 may present the notification received from music sharing computing platform 510. In presenting the notification, listener computing device 540 may display and/or otherwise present a graphical user interface similar to graphical user interface 700, which is illustrated in FIG. 7. As seen in FIG. 7, graphical user interface 700 may include information indicating that an influencer associated with influencer computing device 520 has started live streaming audio content and/or prompting the user of listener computing device 540 to join, listen to, and/or otherwise play back the music stream originating from influencer computing device 520. In addition, in the example shown in FIG. 7, the user of listener computing device 540 might not currently be streaming or otherwise playing back any audio content via the music streaming application. At step 624, listener computing device 540 may receive input requesting to tune into the music stream being shared by influencer computing device 520. Such input may, for instance, be received via and/or in response to the notification presented by listener computing device 540 at step 623.

Referring to FIG. 6G, at step 625, listener computing device 540 may generate a stream request (e.g., based on the input requesting to tune into the music stream being shared by influencer computing device 520 received at step 624). At step 626, listener computing device 540 may send the stream request to music sharing computing platform 510. At step 627, music sharing computing platform 510 may receive the stream request from listener computing device 540. At step 628, music sharing computing platform 510 may evaluate tracking information for listener computing device 540 (e.g., in response to and/or otherwise based on receiving the stream request from listener computing device 540). For example, at step 628, music sharing computing platform 510 may evaluate first tracking information associated with a first listener device of the plurality of listener devices (e.g., listener computing device 540) to enforce one or more playback restrictions on the first listener device (e.g., listener computing device 540). For instance, music sharing computing platform 510 may evaluate the first tracking information associated with the first listener device of the plurality of listener devices (e.g., listener computing device 540) to determine whether to approve or deny the stream request received from listener computing device 540. Music sharing computing platform 510 may, for instance, approve the stream request received from listener computing device 540 if listener computing device 540 can play back the song currently playing on the music stream without violating one or more playback restrictions. Alternatively, music sharing computing platform 510 may, for instance, deny the stream request received from listener computing device 540 if listener computing device 540 cannot play back the song currently playing on the music stream without violating one or more playback restrictions.

In some embodiments, the one or more playback restrictions may include one or more license restrictions. For example, the one or more playback restrictions (which may, e.g., be enforced by music sharing computing platform 510) may include one or more license restrictions. The one or more license restrictions may, for instance, include license restrictions associated with digital playback of one or more songs played on and/or available via the first real-time music stream, such as one or more DMCA restrictions associated with digital playback of one or more songs played on and/or available via the first real-time music stream.

In some embodiments, the one or more playback restrictions may include one or more playback rules different from the one or more license restrictions. For example, the one or more playback restrictions (which may, e.g., be enforced by music sharing computing platform 510) may include one or more playback rules different from the one or more license restrictions. The playback rules may, for instance, include playback rules that are defined and/or enforced by the organization operating music sharing computing platform 510 and/or by another entity and might not, for instance, be dictated by one or more license restrictions.

Referring to FIG. 6H, at step 629, music sharing computing platform 510 may approve the stream request received from listener computing device 540. For example, at step 629, music sharing computing platform 510 may approve the stream request received from listener computing device 540 based on the tracking information associated with listener computing device 540 (which may, e.g., have been defined in and/or exist from a previous streaming session). Although music sharing computing platform 510 is illustrated as approving the stream request received from listener computing device 540 in the example discussed here, music sharing computing platform 510 might alternatively disapprove the stream request received from listener computing device 540 in some instances (e.g., if, based on tracking information, one or more license restrictions, and/or other playback rules, music sharing computing platform 510 determines that listener computing device 540 is not authorized to receive the stream and/or the current song playing on or otherwise associated with the stream). Additionally or alternatively, music sharing computing platform 510 may, in some instances, evaluate tracking information associated with listener computing device 540 before sending a notification to listener computing device 540 (e.g., such that music sharing computing platform 510 may pre-approve listener computing device 540 to receive the music stream before even notifying listener computing device 540 that the stream is available, or alternatively, might not notify listener computing device 540 of the stream if listener computing device 540 is not approved to receive the stream in view of tracking information and/or any applicable playback restrictions).

At step 630, music sharing computing platform 510 may generate a notification for listener computing device 550. For example, at step 630, music sharing computing platform 510 may generate a notification for listener computing device 550 indicating that the music stream associated with influencer computing device 520 is available, based on listener computing device 550 subscribing to music streams from influencer computing device 520.

At step 631, music sharing computing platform 510 may send the notification to listener computing device 550. For example, at step 631, music sharing computing platform 510 may send, via the communication interface (e.g., communication interface 517), and to the second listener device of the plurality of listener devices (e.g., listener computing device 550), a second notification indicating that the first real-time music stream has started. In some instances, music sharing computing platform 510 may send the notification (e.g., to listener computing device 550) via a push notification service associated with a mobile operating system of the second listener device (e.g., listener computing device 550).

At step 632, listener computing device 550 may receive the notification from music sharing computing platform 510. For instance, listener computing device 550 may receive the push notification music sharing computing platform 510 via a push notification service associated with a mobile operating system of listener computing device 550.

Figure 8:
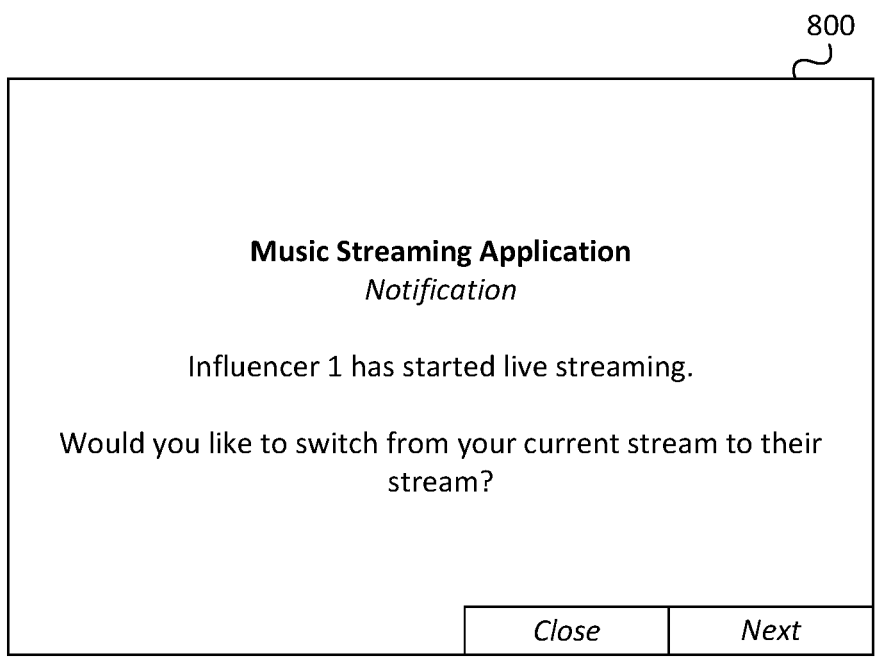

Referring to FIG. 6I, at step 633, listener computing device 550 may present the notification received from music sharing computing platform 510. In presenting the notification, listener computing device 550 may display and/or otherwise present a graphical user interface similar to graphical user interface 800, which is illustrated in FIG. 8. As seen in FIG. 8, graphical user interface 800 may include information indicating that an influencer associated with influencer computing device 520 has started live streaming audio content and/or prompting the user of listener computing device 550 to join, listen to, and/or otherwise play back the music stream originating from influencer computing device 520. In addition, in the example shown in FIG. 8, the user of listener computing device 550 might already be streaming or otherwise playing back other audio content (e.g., different from the music stream originating from influencer computing device 520) via the music streaming application.

At step 634, listener computing device 550 may receive input requesting to tune into the music stream being shared by influencer computing device 520. Such input may, for instance, be received via and/or in response to the notification presented by listener computing device 550 at step 633. At step 635, listener computing device 550 may generate a stream request (e.g., based on the input requesting to tune into the music stream being shared by influencer computing device 520 received at step 634). At step 636, listener computing device 550 may send the stream request to music sharing computing platform 510.

Referring to FIG. 6J, at step 637, music sharing computing platform 510 may receive the stream request from listener computing device 550. At step 638, music sharing computing platform 510 may evaluate tracking information for listener computing device 550 (e.g., in response to and/or otherwise based on receiving the stream request from listener computing device 550). For example, at step 638, music sharing computing platform 510 may evaluate second tracking information associated with a second listener device of the plurality of listener devices (e.g., listener computing device 550) to enforce the one or more playback restrictions on the second listener device (e.g., listener computing device 550). For instance, music sharing computing platform 510 may evaluate the second tracking information associated with the second listener device of the plurality of listener devices (e.g., listener computing device 550) to determine whether to approve or deny the stream request received from listener computing device 550. Music sharing computing platform 510 may, for instance, approve the stream request received from listener computing device 550 if listener computing device 550 can play back the song currently playing on the music stream without violating one or more playback restrictions. Alternatively, music sharing computing platform 510 may, for instance, deny the stream request received from listener computing device 550 if listener computing device 550 cannot play back the song currently playing on the music stream without violating one or more playback restrictions.

In some embodiments, the second listener device of the plurality of listener devices may be different from the first listener device of the plurality of listener devices. For example, the second listener device of the plurality of listener devices (e.g., listener computing device 550) may be different from the first listener device of the plurality of listener devices (e.g., listener computing device 540). For instance, listener computing device 550 may be associated with a different user, be of a different make and/or model, have a different operating system, have a different software application and/or different version of a software application, and/or the like, relative to listener computing device 540.

In some embodiments, the one or more playback restrictions may be enforced on the second listener device separately from the one or more playback restrictions enforced on the first listener device. For example, the one or more playback restrictions may be enforced (e.g., by music sharing computing platform 510) on the second listener device (e.g., listener computing device 550) separately from the one or more playback restrictions enforced on the first listener device (e.g., listener computing device 540). For instance, music sharing computing platform 510 may separately track the playback history of each listener device (e.g., listener computing device 540, listener computing device 550, etc.) and may separately enforce one or more playback restrictions on each listener device (e.g., listener computing device 540, listener computing device 550, etc.) based on each listener device's individual playback history.

At step 639, music sharing computing platform 510 may approve the stream request received from listener computing device 550. For example, at step 639, music sharing computing platform 510 may approve the stream request received from listener computing device 550 based on the tracking information associated with listener computing device 550 (which may, e.g., have been defined in and/or exist from a previous streaming session). Although music sharing computing platform 510 is illustrated as approving the stream request received from listener computing device 550 in the example discussed here, music sharing computing platform 510 might alternatively disapprove the stream request received from listener computing device 550 in some instances (e.g., if, based on tracking information, one or more license restrictions, and/or other playback rules, music sharing computing platform 510 determines that listener computing device 550 is not authorized to receive the stream and/or the current song playing on or otherwise associated with the stream). Additionally or alternatively, music sharing computing platform 510 may, in some instances, evaluate tracking information associated with listener computing device 550 before sending a notification to listener computing device 550 (e.g., such that music sharing computing platform 510 may pre-approve listener computing device 550 to receive the music stream before even notifying listener computing device 550 that the stream is available, or alternatively, might not notify listener computing device 550 of the stream if listener computing device 550 is not approved to receive the stream in view of tracking information and/or any applicable playback restrictions).

At step 640, music sharing computing platform 510 may begin sharing the music stream being shared by influencer computing device 520. For example, at step 640, based on evaluating the first tracking information associated with the first listener device of the plurality of listener devices (e.g., listener computing device 540) and the second tracking information associated with the second listener device of the plurality of listener devices (e.g., listener computing device 550), music sharing computing platform 510 may share the first real-time music stream with the first listener device of the plurality of listener devices (e.g., listener computing device 540) and the second listener device of the plurality of listener devices (e.g., listener computing device 550). For instance, music sharing computing platform 510 may initiate one or more streaming connections with the listener devices (e.g., listener computing device 540, listener computing device 550, etc.) based on evaluating tracking information for the listener devices, based on approving the listener devices to receive the music stream originating from influencer computing device 520, and/or based on the requests to receive the music stream originating from influencer computing device 520 received from the listener devices. As illustrated in greater detail below, in sharing the first real-time music stream, music sharing computing platform 510 may, for example, allow both the first listener device (e.g., listener computing device 540) and the second listener device (e.g., listener computing device 550) to listen to and playback the music stream while a certain song is playing, but music sharing computing platform 510 may switch and/or prevent one or more of the listener devices (e.g., listener computing device 540, listener computing device 550, etc.) from listening to and/or playing back the music stream when another different song starts playing, depending on each individual listener device's tracking information and corresponding individual playback history.

In some embodiments, sharing the first real-time music stream with the first listener device of the plurality of listener devices and the second listener device of the plurality of listener devices may include sending, via the communication interface, and to the first listener device of the plurality of listener devices, streaming audio data associated with the first real-time music stream to cause the first listener device of the plurality of listener devices to play back audio content associated with the first real-time music stream substantially contemporaneously with the first influencer device; and sending, via the communication interface, and to the second listener device of the plurality of listener devices, the streaming audio data associated with the first real-time music stream to cause the second listener device of the plurality of listener devices to play back the audio content associated with the first real-time music stream substantially contemporaneously with the first influencer device. For example, in sharing the first real-time music stream with the first listener device of the plurality of listener devices (e.g., listener computing device 540) and the second listener device of the plurality of listener devices (e.g., listener computing device 550), music sharing computing platform 510 may send, via the communication interface (e.g., communication interface 517), and to the first listener device of the plurality of listener devices (e.g., listener computing device 540), streaming audio data associated with the first real-time music stream to cause the first listener device of the plurality of listener devices (e.g., listener computing device 540) to play back audio content associated with the first real-time music stream substantially contemporaneously with the first influencer device (e.g., influencer computing device 520). In addition, music sharing computing platform 510 may send, via the communication interface (e.g., communication interface 517), and to the second listener device of the plurality of listener devices (e.g., listener computing device 550), the streaming audio data associated with the first real-time music stream to cause the second listener device of the plurality of listener devices (e.g., listener computing device 550) to play back the audio content associated with the first real-time music stream substantially contemporaneously with the first influencer device (e.g., influencer computing device 520). In this way, audio content played back by the first listener device (e.g., listener computing device 540) and the second listener device (e.g., listener computing device 550) may be substantially synchronized (e.g., in playback time) with audio content being played back on and/or selected for playback by the first influencer device (e.g., influencer computing device 520).

Referring to FIG. 6K, at step 641, music sharing computing platform 510 may load audio data. For example, at step 641, music sharing computing platform 510 may load audio data for music content being played by influencer computing device 520 and/or to be shared with listener computing device 540, listener computing device 550, and/or other listener devices. Such audio data may, for instance, be loaded by music sharing computing platform 510 (e.g., from music library 516) based on the stream information received from influencer computing device 520. At step 642, music sharing computing platform 510 may create an audio stream. For example, at step 642, in creating the audio stream, music sharing computing platform 510 may package the audio data (e.g., loaded from music library 516 at step 641, based on time counter information received from influencer computing device 520) for transmission to the listener devices (e.g., listener computing device 540, listener computing device 550, etc.) via the one or more streaming connections created by music sharing computing platform 510.

Figure 9:
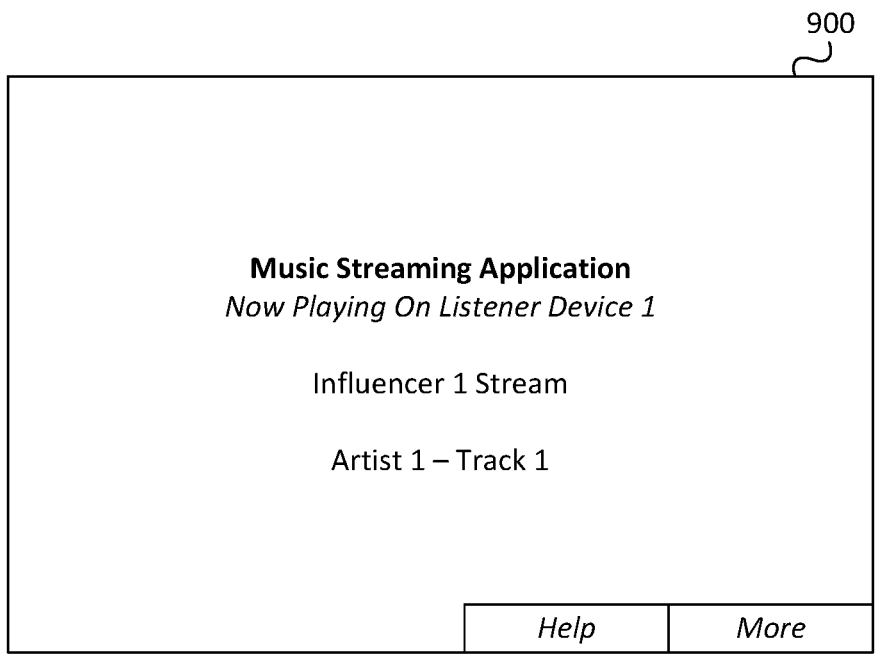
Figure 10:
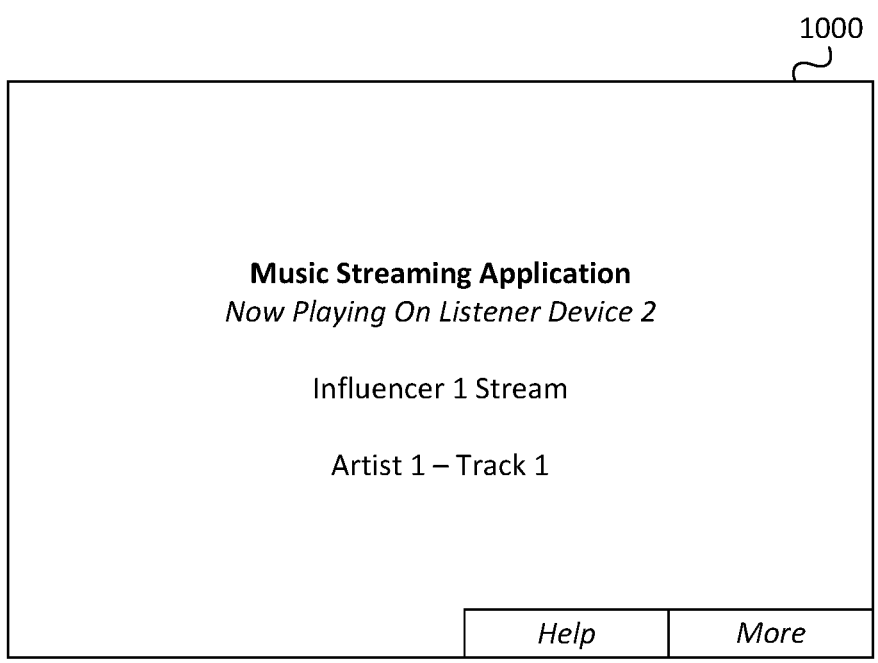

At step 643, music sharing computing platform 510 may send the audio stream to one or more listener devices (e.g., listener computing device 540 and listener computing device 550). In sending the audio stream to the one or more listener devices, music sharing computing platform 510 may cause the one or more listener devices (e.g., listener computing device 540 and listener computing device 550) to play back the audio stream and/or present one more graphical user interfaces. For example, in playing back the audio stream, listener computing device 540 may display and/or otherwise present a graphical user interface similar to graphical user interface 900, which is illustrated in FIG. 9. As seen in FIG. 9, graphical user interface 900 may include information indicating that listener computing device 540 is currently playing back a music stream originating from and/or otherwise associated with influencer computing device 520, as well as information identifying the song that is currently playing on the music stream. In addition, listener computing device 550, which may be playing the same music stream and thus the same song, may present a similar graphical user interface as listener computing device 540. For example, in playing back the audio stream, listener computing device 550 may display and/or otherwise present a graphical user interface similar to graphical user interface 1000, which is illustrated in FIG. 10. As seen in FIG. 10, graphical user interface 1000 may include information indicating that listener computing device 550 is currently playing back a music stream originating from and/or otherwise associated with influencer computing device 520, as well as information identifying the song that is currently playing on the music stream.

At step 644, music sharing computing platform 510 may update tracking information (e.g., for the one or more listener devices receiving the audio stream). For instance, at step 644, music sharing computing platform 510 may update tracking information for listener computing device 540, listener computing device 550, and/or any other listener devices receiving the music stream to reflect the playback of the song currently playing on the music stream on each specific listener device of the plurality of listener devices receiving the music stream. For example, at step 644, based on sharing the first real-time music stream with the first listener device of the plurality of listener devices (e.g., listener computing device 540) and the second listener device of the plurality of listener devices (e.g., listener computing device 550), music sharing computing platform 510 may update first tracking information associated with the first listener device of the plurality of listener devices (e.g., listener computing device 540). In addition, based on sharing the first real-time music stream with the first listener device of the plurality of listener devices (e.g., listener computing device 540) and the second listener device of the plurality of listener devices (e.g., listener computing device 550), music sharing computing platform 510 may update second tracking information associated with the second listener device of the plurality of listener devices (e.g., listener computing device 550). Such tracking information may, for instance, indicate which specific song(s) were played back on which specific listener device(s) at what specific time(s) and/or date(s), in which order such songs were played back, what streams the songs were played back on, and/or other device-specific historical playback information for each of the listener devices receiving the music stream.

Referring to FIG. 6L, at step 645, music sharing computing platform 510 may receive one or more additional stream requests (e.g., from one or more other listener devices different from listener computing device 540, listener computing device 550, and/or any other listener devices already receiving the music stream associated with influencer computing device 520). For example, at step 645, after sharing the first real-time music stream with the first listener device of the plurality of listener devices (e.g., listener computing device 540) and the second listener device of the plurality of listener devices (e.g., listener computing device 550), music sharing computing platform 510 may receive, via the communication interface (e.g., communication interface 517), from at least one listener device not included in the plurality of listener devices, at least one request for the first real-time music stream.

At step 646, music sharing computing platform 510 may process the one or more additional stream requests. For example, at step 646, music sharing computing platform 510 may process the at least one request for the first real-time music stream received from the at least one listener device not included in the plurality of listener devices, based on tracking information associated with the at least one listener device not included in the plurality of listener devices. For instance, music sharing computing platform 510 may allow and/or deny access to the music stream (e.g., to the at least one listener device not included in the plurality of listener devices) based on licensing restrictions and/or other playback rules, similar to how music sharing computing platform 510 may allow and/or deny access to the music stream to listener computing device 540 and listener computing device 550, as discussed above. In this way, music sharing computing platform 510 may, for instance, receive and/or process additional stream requests from other listener devices while streaming and/or otherwise playing a particular song to listener computing device 540 and/or listener computing device 550. At step 647, music sharing computing platform 510 may update tracking information (e.g., for one or more other listener devices which sent music sharing computing platform 510 the one or more additional stream requests and/or are otherwise associated with the one or more additional stream requests, similar to how music sharing computing platform 510 may update tracking information for listener computing device 540 and/or listener computing device 550, as discussed above).

At step 648, influencer computing device 520 may initiate playback of a second song (e.g., different from the first song initially played by influencer computing device 520). For example, at step 648, influencer computing device 520 may begin playing a second song and/or other audio content within the music streaming application that is different from the first song that was previously being played within the music streaming application (which may, e.g., have been initiated at step 616, as discussed above). As illustrated in greater detail below, when music sharing computing platform 510 detects that a new song is starting on influencer computing device 520, music sharing computing platform 510 may reevaluate the tracking information for the various listener devices to ensure that each listener device can continue to receive the music stream originating from influencer computing device 520 without violating any license restrictions or other applicable playback rules.

Referring to FIG. 6M, at step 649, influencer computing device 520 may send updated stream information to music sharing computing platform 510. For example, at step 649, influencer computing device 520 may send updated stream information to music sharing computing platform 510 based on the initiation of the playback of the second song. Such updated stream information may, for instance, identify the second song and/or include time counter information indicating a current time position within the second song (which may, e.g., be updated by influencer computing device 520 in real-time as playback of the second song proceeds on influencer computing device 520). Additionally or alternatively, such updated stream information may, for instance, include actual audio data of the second song to enable playback by one or more other devices.

At step 650, music sharing computing platform 510 may receive the updated stream information from influencer computing device 520 (which may, e.g., indicate that the second song is starting). At step 651, music sharing computing platform 510 may detect that a new song has started (e.g., based on the updated stream information received from influencer computing device 520). For example, at step 651, music sharing computing platform 510 may detect that a new song is starting on the first real-time music stream associated with influencer computing device 520.

At step 652, music sharing computing platform 510 may evaluate tracking information for each listener device currently receiving the audio stream originating from influencer computing device 520. For example, at step 652, music sharing computing platform 510 may evaluate tracking information for each listener device currently receiving the audio stream to identify which, if any, of the listener devices might not be permitted to receive the new song in view of any applicable license restrictions, and thus which, if any, of the listener devices might need to be switched to a different stream or switched off. Music sharing computing platform 510 then may enforce one or more playback restrictions based on the tracking information, for instance, by continuing the music stream for some listener devices and/or switching the music stream to a different stream (or no stream) for some other listener devices, as illustrated in greater detail below.

For example, based on detecting that the new song is starting on the first real-time music stream (e.g., at step 651), music sharing computing platform 510 may reevaluate the first tracking information associated with the first listener device of the plurality of listener devices (e.g., listener computing device 540) to enforce the one or more playback restrictions on the first listener device (e.g., listener computing device 540). Prior to the reevaluation, the first tracking information associated with the first listener device of the plurality of listener devices (e.g., listener computing device 540) may, for instance, have been updated by music sharing computing platform 510 to reflect the one or more songs that the first listener device (e.g., listener computing device 540) previously played since starting playback of the music stream originating from influencer computing device 520. In addition, based on reevaluating the first tracking information associated with the first listener device of the plurality of listener devices (e.g., listener computing device 540) to enforce the one or more playback restrictions on the first listener device (e.g., listener computing device 540), music sharing computing platform 510 may allow the first listener device of the plurality of listener devices (e.g., listener computing device 540) to continue playback of the first real-time music stream. In allowing the first listener device of the plurality of listener devices (e.g., listener computing device 540) to continue playback of the first real-time music stream, music sharing computing platform 510 may, for instance, continue sending the music stream to the first listener device (e.g., listener computing device 540) once and/or after the new song starts playing on the music stream, as illustrated in greater detail below.

Figure 11:
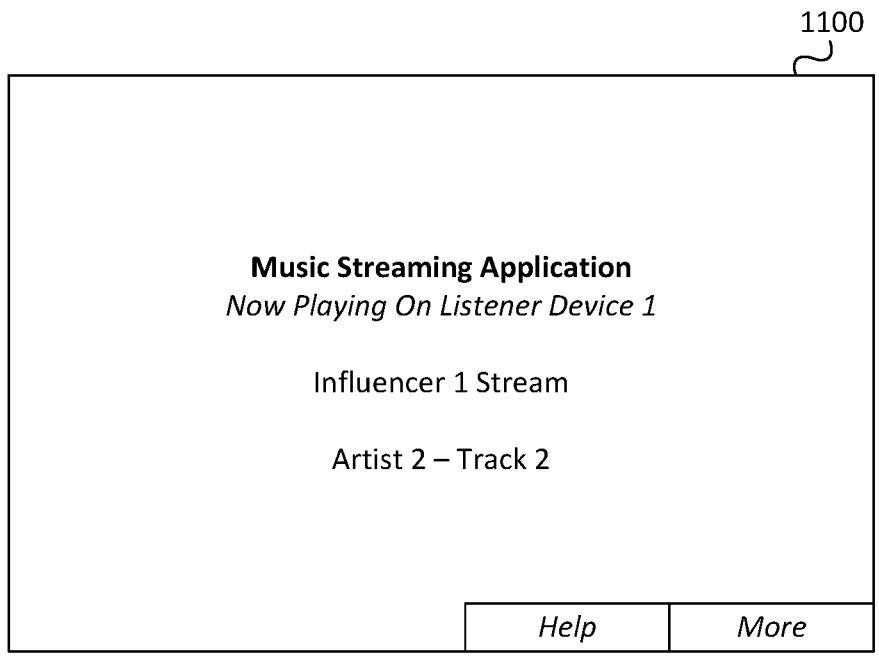

Referring to FIG. 6N, at step 653, music sharing computing platform 510 may continue the audio stream for one or more approved listener devices. For example, at step 653, music sharing computing platform 510 may continue the audio stream for listener computing device 540 and/or any other approved listener devices. In continuing to play back the audio stream, listener computing device 540 may display and/or otherwise present a graphical user interface similar to graphical user interface 1100, which is illustrated in FIG. 11. As seen in FIG. 11, graphical user interface 1100 may include information indicating that listener computing device 540 is continuing to play back a music stream originating from and/or otherwise associated with influencer computing device 520, as well as information identifying the new song that is currently playing on the music stream.

In addition, based on detecting that the new song is starting on the first real-time music stream (e.g., at step 651), music sharing computing platform 510 may reevaluate the second tracking information associated with the second listener device of the plurality of listener devices (e.g., listener computing device 550) to enforce the one or more playback restrictions on the second listener device (e.g., listener computing device 550). Prior to the reevaluation, the second tracking information associated with the second listener device of the plurality of listener devices (e.g., listener computing device 550) may, for instance, have been updated by music sharing computing platform 510 to reflect the one or more songs that the second listener device (e.g., listener computing device 550) previously played since starting playback of the music stream originating from influencer computing device 520. In addition, based on reevaluating the second tracking information associated with the second listener device of the plurality of listener devices (e.g., listener computing device 550) to enforce the one or more playback restrictions on the second listener device (e.g., listener computing device 550), music sharing computing platform 510 may prevent the second listener device of the plurality of listener devices (e.g., listener computing device 550) from continuing playback of the first real-time music stream. In preventing the second listener device of the plurality of listener devices (e.g., listener computing device 550) from continuing playback of the first real-time music stream, music sharing computing platform 510 may, for instance, switch the second listener device (e.g., listener computing device 550) to a different stream once and/or shortly after the new song starts playing on the music stream, or may simply stop streaming content to the second listener device (e.g., listener computing device 550) once and/or shortly after the new song starts playing on the music stream, as illustrated in greater detail below.

In this example, listener computing device 550 may be treated differently by music sharing computing platform 510 than listener computing device 540 because listener computing device 550 may have a different playback history than listener computing device 540 (which may, e.g., be reflected in the corresponding tracking information for each of listener computing device 540 and listener computing device 550). For instance, listener computing device 550 may have been listening to a certain song prior to joining the music stream originating from influencer computing device 520, which may affect how the applicable playback restrictions are enforced on listener computing device 550 by music sharing computing platform 510, while listener computing device 540 might not have been listening to that certain song prior to joining the music stream originating from influencer computing device 520. As another example, listener computing device 540 may have joined a music stream originating from influencer computing device 520 at a first time when a first song was playing on the music stream, and listener computing device 550 may have joined the music stream at a second time when a second song different from the first song was playing on the music stream. In some instances, being switched to a different stream (or to no stream entirely) by music sharing computing platform 510, listener computing device 550 may, for instance, be switched back onto the stream originating from influencer computing device 520 (e.g., by music sharing computing platform 510) once yet another new song starts playing and listener computing device 550 can once again receive and play the song playing on the stream originating from influencer computing device 520 without violating one or more license restrictions and/or other playback restrictions.

Figure 12:
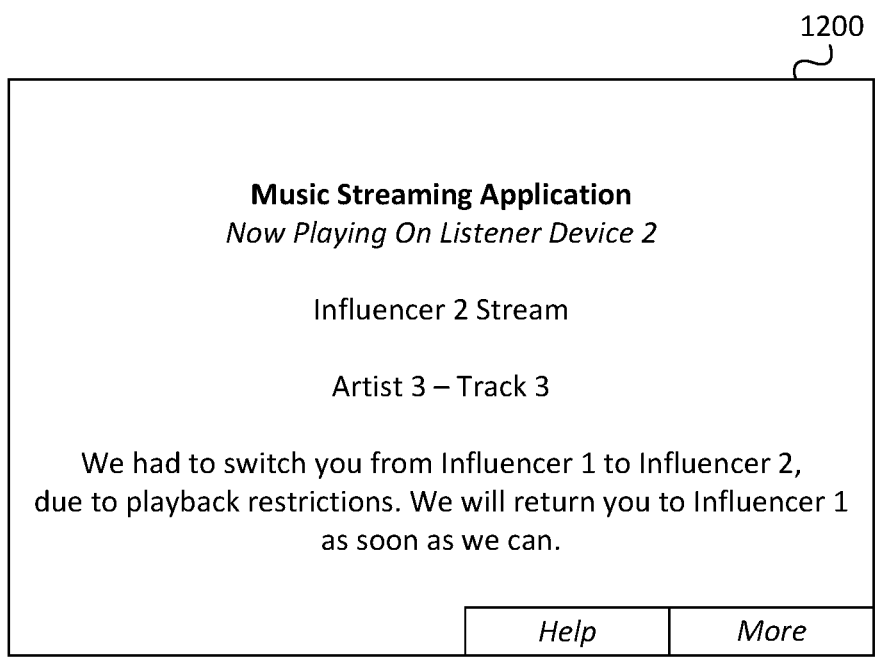

At step 654, music sharing computing platform 510 may switch the audio stream for one or more non-approved listener devices. For example, at step 654, music sharing computing platform 510 may switch the audio stream for listener computing device 550 and/or any other non-approved listener devices. In switching the audio stream, music sharing computing platform 510 may, for instance, stop sending such listener devices the audio stream originating from influencer computing device 520 and/or may send one or more different audio streams to listener computing device 550 and/or any other non-approved listener devices. In this way, based on the tracking information specific to each listener device, music sharing computing platform 510 may, for instance, enforce one or more licensing restrictions and/or other playback restrictions. After being switched to a different audio stream by music sharing computing platform 510, listener computing device 550 may, for instance, display and/or otherwise present a graphical user interface similar to graphical user interface 1200, which is illustrated in FIG. 12. As seen in FIG. 12, graphical user interface 1200 may include information indicating that listener computing device 550 has been switched to a different music stream (e.g., different from the music stream originating from and/or otherwise associated with influencer computing device 520) as a result of playback restrictions, as well as information identifying the new music stream (e.g., to which listener computing device 550 has been switched) and the new song that is currently playing on the new music stream.

At step 655, music sharing computing platform 510 may update tracking information. For instance, music sharing computing platform 510 may update tracking information for listener computing device 540, listener computing device 550, and/or any other listener devices receiving audio streams from music sharing computing platform 510, so as to record the one or more songs currently being played back on each specific listener device. For example, at step 655, based on allowing the first listener device of the plurality of listener devices (e.g., listener computing device 540) to continue playback of the first real-time music stream (e.g., associated with influencer computing device 520), music sharing computing platform 510 may update the first tracking information associated with the first listener device of the plurality of listener devices (e.g., listener computing device 540). Music sharing computing platform 510 may, for instance, update the first tracking information associated with the first listener device of the plurality of listener devices (e.g., listener computing device 540) to record that listener computing device 540 is now receiving the new song currently playing on the first real-time music stream (e.g., associated with influencer computing device 520). In addition, based on preventing the second listener device of the plurality of listener devices (e.g., listener computing device 550) from continuing playback of the first real-time music stream (e.g., associated with influencer computing device 520), music sharing computing platform 510 may update the second tracking information associated with the second listener device of the plurality of listener devices (e.g., listener computing device 550). Music sharing computing platform 510 may, for instance, update the second tracking information associated with the second listener device of the plurality of listener devices (e.g., listener computing device 550) to record that listener computing device 550 is now receiving a new song currently playing on a new music stream different from the first real-time music stream associated with influencer computing device 520.

At step 656, music sharing computing platform 510 may receive one or more additional stream requests (e.g., from one or more other listener devices different from listener computing device 540 and listener computing device 550, similar to how such additional stream requests may be received, as discussed above). Referring to FIG. 6O, at step 657, music sharing computing platform 510 may process the one or more additional stream requests (e.g., by allowing and/or denying one or more other listener devices to one or more music streams, based on one or more licensing restrictions and/or other playing restrictions, similar to how such additional stream requests may be processed, as discussed above). At step 658, music sharing computing platform 510 may update tracking information (e.g., for one or more other listener devices, based on processing the one or more additional stream requests, similar to how such tracking information may be updated, as discussed above).

Subsequently, one or more steps of the example event sequence discussed above may be repeated to facilitate sharing of music streams from other influencer devices with other listener devices. For instance, music sharing computing platform 510 may repeat one or more steps of the example event sequence discussed to share a music stream from influencer computing device 530 with listener computing device 560, listener computing device 570, and/or one or more other listener devices.

For example, in sharing of music streams from other influencer devices with other listener devices, music sharing computing platform 510 may receive, via the communication interface (e.g., communication interface 517), and from a second influencer device (e.g., influencer computing device 530) different from the first influencer device (e.g., influencer computing device 520), second stream information associated with a second real-time music stream. Based on receiving the second stream information associated with the second real-time music stream from the second influencer device (e.g., influencer computing device 530), music sharing computing platform 510 may identify a second plurality of listener devices that subscribe to receive music streams from the second influencer device (e.g., influencer computing device 530). Subsequently, music sharing computing platform 510 may evaluate third tracking information associated with a third listener device of the second plurality of listener devices (e.g., listener computing device 560) to enforce the one or more playback restrictions on the third listener device (e.g., listener computing device 560). In addition, music sharing computing platform 510 may evaluate fourth tracking information associated with a fourth listener device of the second plurality of listener devices (e.g., listener computing device 570) to enforce the one or more playback restrictions on the fourth listener device (e.g., listener computing device 570). Based on evaluating the third tracking information associated with the third listener device of the second plurality of listener devices (e.g., listener computing device 560) and the fourth tracking information associated with the fourth listener device of the second plurality of listener devices (e.g., listener computing device 570), music sharing computing platform 510 may share the second real-time music stream with the third listener device of the second plurality of listener devices (e.g., listener computing device 560) and the fourth listener device of the second plurality of listener devices (e.g., listener computing device 570) (e.g., similar to how music sharing computing platform 510 may share music streams with other listener devices, as discussed above).

Figure 13:
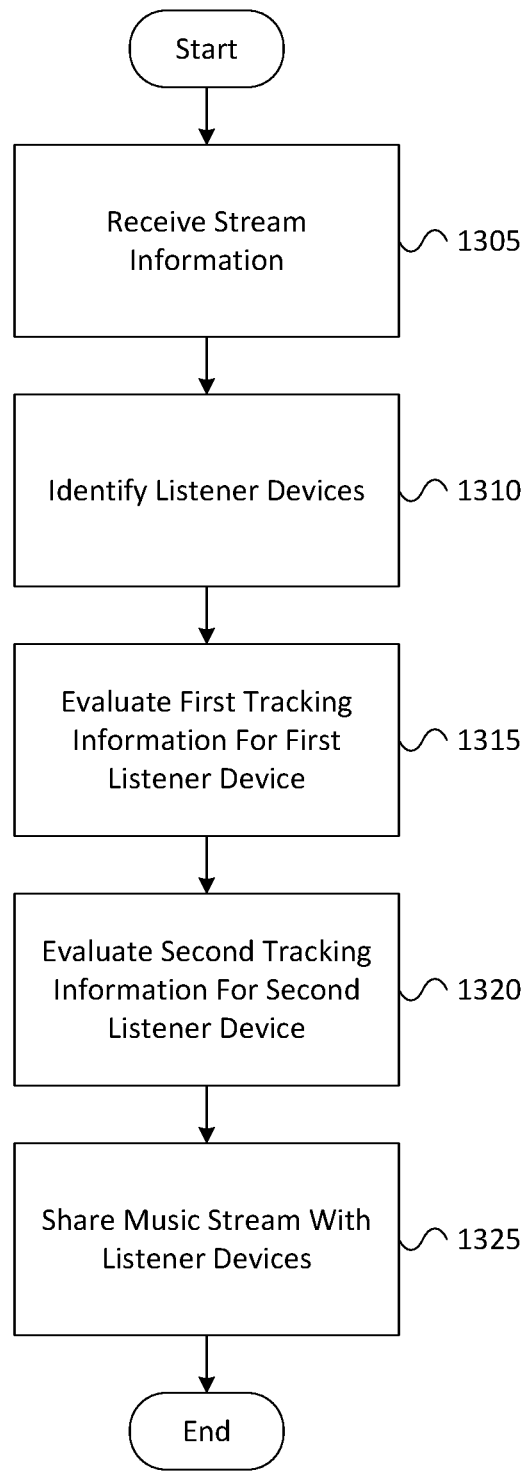
FIG. 13 depicts an illustrative method for streaming influencer device audio content to listener devices in accordance with one or more example embodiments.

FIG. 13 depicts an illustrative method for streaming influencer device audio content to listener devices in accordance with one or more example embodiments. Referring to FIG. 13, at step 1305, a computing platform having at least one processor, a memory, and a communication interface may receive, via the communication interface, and from a first influencer device, first stream information associated with a first real-time music stream. At step 1310, based on receiving the first stream information associated with the first real-time music stream from the first influencer device, the computing platform may identify a plurality of listener devices that subscribe to receive music streams from the first influencer device. At step 1315, the computing platform may evaluate first tracking information associated with a first listener device of the plurality of listener devices to enforce one or more playback restrictions on the first listener device. At step 1320, the computing platform may evaluate second tracking information associated with a second listener device of the plurality of listener devices to enforce the one or more playback restrictions on the second listener device. At step 1325, based on evaluating the first tracking information associated with the first listener device of the plurality of listener devices and the second tracking information associated with the second listener device of the plurality of listener devices, the computing platform may share the first real-time music stream with the first listener device of the plurality of listener devices and the second listener device of the plurality of listener devices.

Various aspects described herein may be embodied as a method, an apparatus, or as one or more computer-readable media storing computer-executable instructions. Accordingly, those aspects may take the form of an entirely hardware embodiment, an entirely software embodiment, or an embodiment combining software and hardware aspects. Any and/or all of the method steps described herein may be embodied in computer-executable instructions stored on a computer-readable medium, such as a non-transitory computer readable memory. Additionally or alternatively, any and/or all of the method steps described herein may be embodied in computer-readable instructions stored in the memory of an apparatus that includes one or more processors, such that the apparatus is caused to perform such method steps when the one or more processors execute the computer-readable instructions. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims are included in the scope of the present disclosure. For example, the steps illustrated in the illustrative figures may be performed in other than the recited order, and one or more steps illustrated may be optional in accordance with aspects of the disclosure.

What is claimed is:

1. A system comprising:
    at least one processor;
    a communication interface communicatively coupled to the at least one processor; and
    memory storing computer-readable instructions that, when executed by the at least one processor, cause the system to:
        receive, via the communication interface, and from a first influencer device, first stream information associated with a first real-time music stream;
        based on receiving the first stream information associated with the first real-time music stream from the first influencer device, identify a plurality of listener devices that subscribe to receive music streams from the first influencer device;
        evaluate first tracking information associated with a first listener device of the plurality of listener devices to enforce one or more playback restrictions on the first listener device;
        evaluate second tracking information associated with a second listener device of the plurality of listener devices to enforce the one or more playback restrictions on the second listener device; and
        based on evaluating the first tracking information associated with the first listener device of the plurality of listener devices and the second tracking information associated with the second listener device of the plurality of listener devices, share the first real-time music stream with the first listener device of the plurality of listener devices and the second listener device of the plurality of listener devices,
    wherein the first real-time music stream is defined by one or more playback selections made by a user of the first influencer device,
    wherein the first stream information associated with the first real-time music stream received from the first influencer device comprises metadata associated with a first song being played back by the first influencer device, the metadata associated with the first song being played back by the first influencer device comprising information identifying the first song being played back by the first influencer device and a time counter identifying a current playback position of the first influencer device within the first song being played back by the first influencer device,
    wherein the one or more playback restrictions comprise one or more license restrictions associated with playback of internet radio stations, and
    wherein the memory stores additional computer-readable instructions that, when executed by the at least one processor, cause the system to:
        detect that a new song is starting on the first real-time music stream;
        based on detecting that the new song is starting on the first real-time music stream, reevaluate the first tracking information associated with the first listener device of the plurality of listener devices to enforce the one or more playback restrictions on the first listener device;
        based on reevaluating the first tracking information associated with the first listener device of the plurality of listener devices to enforce the one or more playback restrictions on the first listener device, allow the first listener device of the plurality of listener devices to continue playback of the first real-time music stream;
        based on detecting that the new song is starting on the first real-time music stream, reevaluate the second tracking information associated with the second listener device of the plurality of listener devices to enforce the one or more playback restrictions on the second listener device; and
        based on reevaluating the second tracking information associated with the second listener device of the plurality of listener devices to enforce the one or more playback restrictions on the second listener device, prevent the second listener device of the plurality of listener devices from continuing playback of the first real-time music stream.

2. The system of claim 1, wherein the first stream information associated with the first real-time music stream received from the first influencer device comprises audio data associated with a first song being played back by the first influencer device.

3. The system of claim 1, wherein the memory stores additional computer-readable instructions that, when executed by the at least one processor, cause the system to:
    after identifying the plurality of listener devices that subscribe to receive the music streams from the first influencer device:
        send, via the communication interface, and to the first listener device of the plurality of listener devices, a first notification indicating that the first real-time music stream has started; and
        send, via the communication interface, and to the second listener device of the plurality of listener devices, a second notification indicating that the first real-time music stream has started.

4. The system of claim 1, wherein the one or more playback restrictions comprise one or more playback rules different from the one or more license restrictions.

5. The system of claim 1, wherein the second listener device of the plurality of listener devices is different from the first listener device of the plurality of listener devices.

6. The system of claim 1, wherein the one or more playback restrictions are enforced on the second listener device separately from the one or more playback restrictions enforced on the first listener device.

7. The system of claim 1, wherein sharing the first real-time music stream with the first listener device of the plurality of listener devices and the second listener device of the plurality of listener devices comprises:
   sending, via the communication interface, and to the first listener device of the plurality of listener devices, streaming audio data associated with the first real-time music stream to cause the first listener device of the plurality of listener devices to play back audio content associated with the first real-time music stream substantially contemporaneously with the first influencer device; and
   sending, via the communication interface, and to the second listener device of the plurality of listener devices, the streaming audio data associated with the first real-time music stream to cause the second listener device of the plurality of listener devices to play back the audio content associated with the first real-time music stream substantially contemporaneously with the first influencer device.

8. The system of claim 1, wherein the memory stores additional computer-readable instructions that, when executed by the at least one processor, cause the system to:
   based on sharing the first real-time music stream with the first listener device of the plurality of listener devices and the second listener device of the plurality of listener devices, update first tracking information associated with the first listener device of the plurality of listener devices; and
   based on sharing the first real-time music stream with the first listener device of the plurality of listener devices and the second listener device of the plurality of listener devices, update second tracking information associated with the second listener device of the plurality of listener devices.

9. The system of claim 1, wherein the memory stores additional computer-readable instructions that, when executed by the at least one processor, cause the system to:
   after sharing the first real-time music stream with the first listener device of the plurality of listener devices and the second listener device of the plurality of listener devices:
   receive, via the communication interface, from at least one listener device not included in the plurality of listener devices, at least one request for the first real-time music stream; and
   process the at least one request for the first real-time music stream received from the at least one listener device not included in the plurality of listener devices, based on tracking information associated with the at least one listener device not included in the plurality of listener devices.

10. The system of claim 1, wherein the memory stores additional computer-readable instructions that, when executed by the at least one processor, cause the system to:
    based on allowing the first listener device of the plurality of listener devices to continue playback of the first real-time music stream, update the first tracking information associated with the first listener device of the plurality of listener devices; and
    based on preventing the second listener device of the plurality of listener devices from continuing playback of the first real-time music stream, update the second tracking information associated with the second listener device of the plurality of listener devices.

11. The system of claim 1, wherein the memory stores additional computer-readable instructions that, when executed by the at least one processor, cause the system to:
    prior to receiving the first stream information associated with the first real-time music stream from the first influencer device:
    receive, via the communication interface, and from the first influencer device, a first registration request; and
    store registration information for the first influencer device based on the first registration request received from the first influencer device.

12. The system of claim 11, wherein the memory stores additional computer-readable instructions that, when executed by the at least one processor, cause the system to:
    prior to receiving the first stream information associated with the first real-time music stream from the first influencer device:
    receive, via the communication interface, and from the first listener device of the plurality of listener devices, a second registration request;
    store registration information for the first listener device of the plurality of listener devices based on the second registration request received from the first listener device of the plurality of listener devices;
    receive, via the communication interface, and from the second listener device of the plurality of listener devices, a third registration request; and
    store registration information for the second listener device of the plurality of listener devices based on the third registration request received from the second listener device of the plurality of listener devices.

13. The system of claim 1, wherein the memory stores additional computer-readable instructions that, when executed by the at least one processor, cause the system to:
    receive, via the communication interface, and from a second influencer device different from the first influencer device, second stream information associated with a second real-time music stream;
    based on receiving the second stream information associated with the second real-time music stream from the second influencer device, identify a second plurality of listener devices that subscribe to receive music streams from the second influencer device;
    evaluate third tracking information associated with a third listener device of the second plurality of listener devices to enforce the one or more playback restrictions on the third listener device;
    evaluate fourth tracking information associated with a fourth listener device of the second plurality of listener devices to enforce the one or more playback restrictions on the fourth listener device; and
    based on evaluating the third tracking information associated with the third listener device of the second plurality of listener devices and the fourth tracking information associated with the fourth listener device of the second plurality of listener devices, share the second real-time music stream with the third listener device of the second plurality of listener devices and the fourth listener device of the second plurality of listener devices.

14. A method comprising:
    at a computing platform comprising at least one processor, memory, and a communication interface:

receiving, by the at least one processor, via the communication interface, and from a first influencer device, first stream information associated with a first real-time music stream;
based on receiving the first stream information associated with the first real-time music stream from the first influencer device, identifying, by the at least one processor, a plurality of listener devices that subscribe to receive music streams from the first influencer device;
evaluating, by the at least one processor, first tracking information associated with a first listener device of the plurality of listener devices to enforce one or more playback restrictions on the first listener device;
evaluating, by the at least one processor, second tracking information associated with a second listener device of the plurality of listener devices to enforce the one or more playback restrictions on the second listener device; and
based on evaluating the first tracking information associated with the first listener device of the plurality of listener devices and the second tracking information associated with the second listener device of the plurality of listener devices, sharing, by the at least one processor, the first real-time music stream with the first listener device of the plurality of listener devices and the second listener device of the plurality of listener devices,
wherein the first real-time music stream is defined by one or more playback selections made by a user of the first influencer device,
wherein the first stream information associated with the first real-time music stream received from the first influencer device comprises metadata associated with a first song being played back by the first influencer device, the metadata associated with the first song being played back by the first influencer device comprising information identifying the first song being played back by the first influencer device and a time counter identifying a current playback position of the first influencer device within the first song being played back by the first influencer device,
wherein the one or more playback restrictions comprise one or more license restrictions associated with playback of internet radio stations, and
wherein the method comprises:
detecting, by the at least one processor, that a new song is starting on the first real-time music stream;
based on detecting that the new song is starting on the first real-time music stream, reevaluating, by the at least one processor, the first tracking information associated with the first listener device of the plurality of listener devices to enforce the one or more playback restrictions on the first listener device;
based on reevaluating the first tracking information associated with the first listener device of the plurality of listener devices to enforce the one or more playback restrictions on the first listener device, allowing, by the at least one processor, the first listener device of the plurality of listener devices to continue playback of the first real-time music stream;
based on detecting that the new song is starting on the first real-time music stream, reevaluating, by the at least one processor, the second tracking information associated with the second listener device of the plurality of listener devices to enforce the one or more playback restrictions on the second listener device; and
based on reevaluating the second tracking information associated with the second listener device of the plurality of listener devices to enforce the one or more playback restrictions on the second listener device, preventing, by the at least one processor, the second listener device of the plurality of listener devices from continuing playback of the first real-time music stream.

15. One or more non-transitory computer-readable media storing instructions that, when executed by a computing platform comprising at least one processor, memory, and a communication interface, cause the computing platform to:
receive, via the communication interface, and from a first influencer device, first stream information associated with a first real-time music stream;
based on receiving the first stream information associated with the first real-time music stream from the first influencer device, identify a plurality of listener devices that subscribe to receive music streams from the first influencer device;
evaluate first tracking information associated with a first listener device of the plurality of listener devices to enforce one or more playback restrictions on the first listener device;
evaluate second tracking information associated with a second listener device of the plurality of listener devices to enforce the one or more playback restrictions on the second listener device; and
based on evaluating the first tracking information associated with the first listener device of the plurality of listener devices and the second tracking information associated with the second listener device of the plurality of listener devices, share the first real-time music stream with the first listener device of the plurality of listener devices and the second listener device of the plurality of listener devices,
wherein the first real-time music stream is defined by one or more playback selections made by a user of the first influencer device,
wherein the first stream information associated with the first real-time music stream received from the first influencer device comprises metadata associated with a first song being played back by the first influencer device, the metadata associated with the first song being played back by the first influencer device comprising information identifying the first song being played back by the first influencer device and a time counter identifying a current playback position of the first influencer device within the first song being played back by the first influencer device,
wherein the one or more playback restrictions comprise one or more license restrictions associated with playback of internet radio stations, and
wherein the one or more non-transitory computer-readable media store additional instructions that, when executed by the computing platform, cause the computing platform to:
detect that a new song is starting on the first real-time music stream;
based on detecting that the new song is starting on the first real-time music stream, reevaluate the first tracking information associated with the first listener device of the plurality of listener devices to enforce the one or more playback restrictions on the first listener device;
based on reevaluating the first tracking information associated with the first listener device of the plurality of listener devices to enforce the one or more playback restrictions on the first listener device, allow the first listener device of the plurality of listener devices to continue playback of the first real-time music stream;
based on detecting that the new song is starting on the first real-time music stream, reevaluate the second tracking information associated with the second listener device of the plurality of listener devices to enforce the one or more playback restrictions on the second listener device; and
based on reevaluating the second tracking information associated with the second listener device of the plurality of listener devices to enforce the one or more playback restrictions on the second listener device, prevent the second listener device of the plurality of listener devices from continuing playback of the first real-time music stream.

16. The system of claim 1, wherein the one or more license restrictions associated with playback of internet radio stations comprise one or more Digital Millennium Copyright Act (DMCA) license restrictions on internet radio.

\* \* \* \* \*